(12) United States Patent
Huang et al.

(10) Patent No.: US 11,888,620 B2
(45) Date of Patent: Jan. 30, 2024

(54) MULTI-LINK FRAME DELIVERY

(71) Applicant: Intel Corporation, Santa Clara, CA (US)

(72) Inventors: Po-Kai Huang, San Jose, CA (US); Danny Alexander, Neve Efraim Monoson (IL); Daniel F. Bravo, Hillsboro, OR (US); Ido Ouzieli, Tel Aviv (IL); Danny Ben-Ari, Hasharon Hatichon (IL); Amir Hitron, Beit Ytzhak (IL); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 17/339,367

(22) Filed: Jun. 4, 2021

(65) Prior Publication Data
US 2021/0297184 A1    Sep. 23, 2021

Related U.S. Application Data

(60) Provisional application No. 63/052,108, filed on Jul. 15, 2020, provisional application No. 63/035,296, filed on Jun. 5, 2020.

(51) Int. Cl.
H04W 72/04       (2023.01)
H04L 1/1607      (2023.01)
(Continued)

(52) U.S. Cl.
CPC ............ *H04L 1/1642* (2013.01); *H04L 1/188* (2013.01); *H04L 1/1896* (2013.01); *H04W 8/28* (2013.01); *H04W 80/02* (2013.01)

(58) Field of Classification Search
CPC ..... H04L 1/1642; H04L 1/188; H04L 1/1896; H04L 1/1664; H04L 1/1685; H04W 8/28; H04W 80/02; H04W 84/12
See application file for complete search history.

(56) References Cited

U.S. PATENT DOCUMENTS

| 11,464,027 B2* | 10/2022 | Seok ........................ H04L 47/34 |
| 2008/0212613 A1* | 9/2008 | Perkinson ............. H04L 47/125 370/475 |

(Continued)

*Primary Examiner* — Mahbubul Bar Chowdhury
(74) *Attorney, Agent, or Firm* — Schwegman Lundberg & Woessner, P.A.

(57) ABSTRACT

Methods, apparatuses, and computer readable media for communicating elements between multi-link devices are disclosed. Apparatuses of a first station (STA) affiliated with a multi-link device (MLD) are disclosed, where the apparatuses comprise processing circuitry configured to determine a sequence number as a next sequence number of a sequence number space where the sequence number space is indexed by a MLD media access control (MAC) address of a second MLD, and wherein the processing circuitry is further configured to encode a media access control (MAC) management protocol data unit (MMPDU) in a physical layer (PHY) protocol data unit (PPDU), the MMDPU including the sequence number, a frame body, and an address 1 field, the address 1 field indicating an address of a second station (STA) affiliated with the second MLD, and configure the first STA to transmit the PPDU to the second station.

20 Claims, 17 Drawing Sheets

(51) Int. Cl.
*H04L 1/1867* (2023.01)
*H04W 80/02* (2009.01)
*H04W 8/28* (2009.01)

(56) References Cited

U.S. PATENT DOCUMENTS

| | | | |
|---|---|---|---|
| 2011/0149850 A1* | 6/2011 | Sashihara | H04W 48/16 |
| | | | 370/328 |
| 2020/0077417 A1* | 3/2020 | Seok | H04W 28/04 |
| 2021/0007168 A1* | 1/2021 | Asterjadhi | H04W 52/0216 |
| 2021/0377369 A1* | 12/2021 | Patil | H04L 41/082 |
| 2022/0132610 A1* | 4/2022 | Guo | H04L 47/34 |
| 2022/0287122 A1* | 9/2022 | Wang | H04W 8/22 |
| 2023/0049552 A1* | 2/2023 | Chitrakar | H04W 12/106 |
| 2023/0164634 A1* | 5/2023 | Jang | H04W 28/20 |
| | | | 370/329 |

* cited by examiner

MULTI-LINK FRAME DELIVERY

PRIORITY CLAIM

This application claims the benefit of priority under 35 USC 119(e) to U.S. Provisional Patent Application Ser. No. 63/035,296, filed Jun. 5, 2020, and U.S. Provisional Patent Application Ser. No. 63/052,108, filed Jul. 15, 2020, which is incorporated herein by reference in their entirety.

TECHNICAL FIELD

Embodiments relate to multi-link devices (MLDs) operating in accordance with wireless local area networks (WLANs) and Wi-Fi networks including networks operating in accordance with different versions or generations of the IEEE 802.11 family of standards. Some embodiments relate to communicating individually addressed management frame from a station (STA) or AP of one MLD to a STA of another MLD.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols, and wireless devices may need to operate with more than one frequency band.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
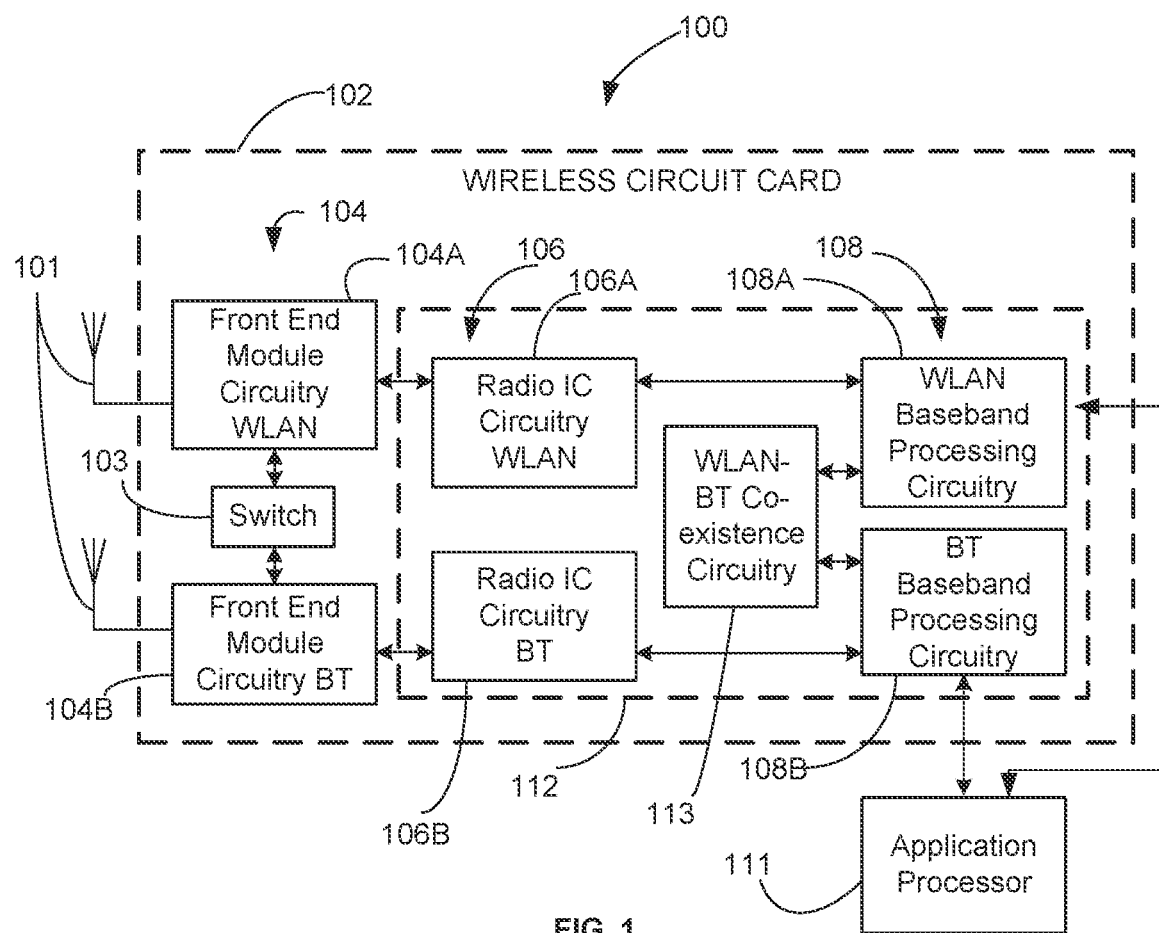
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
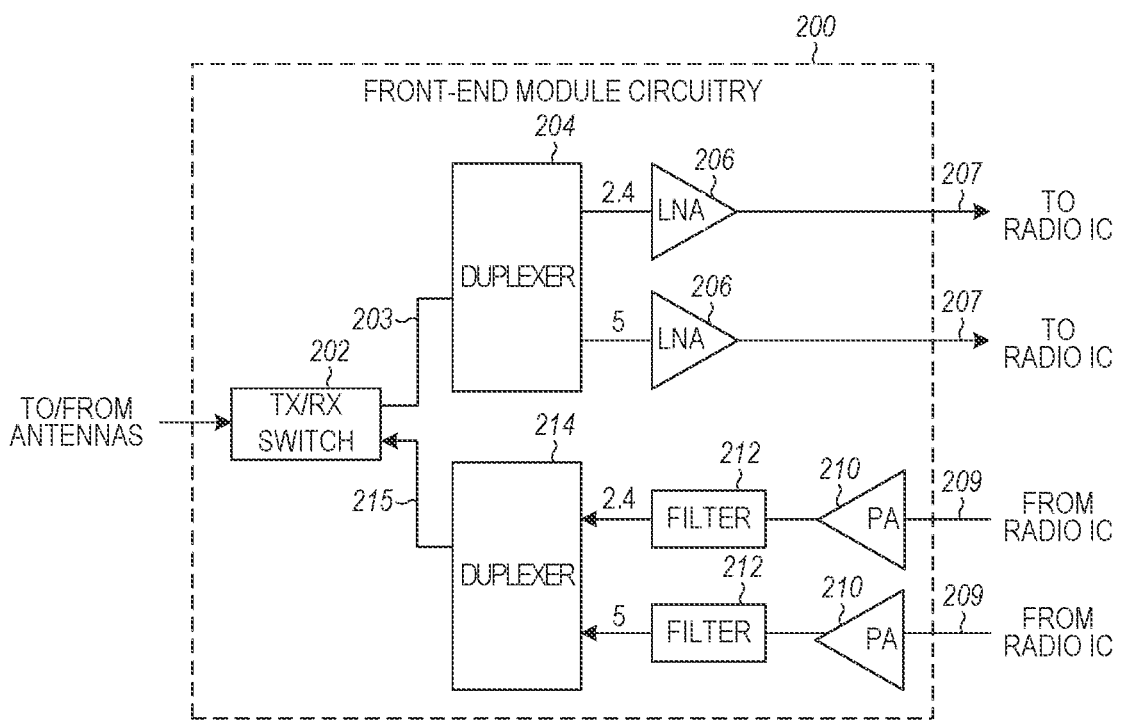
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
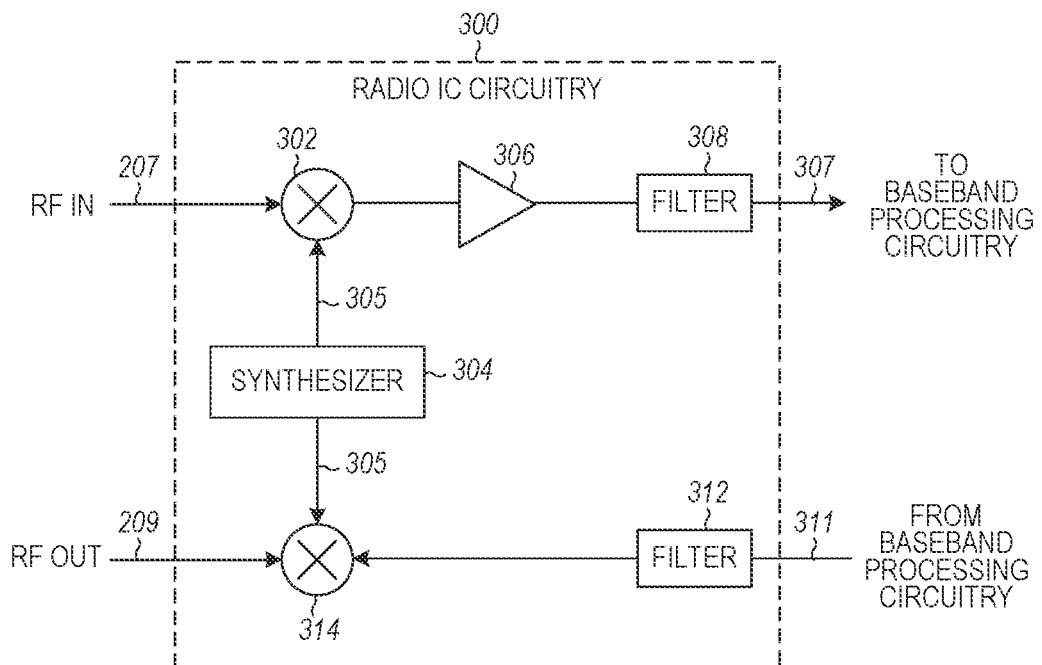
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
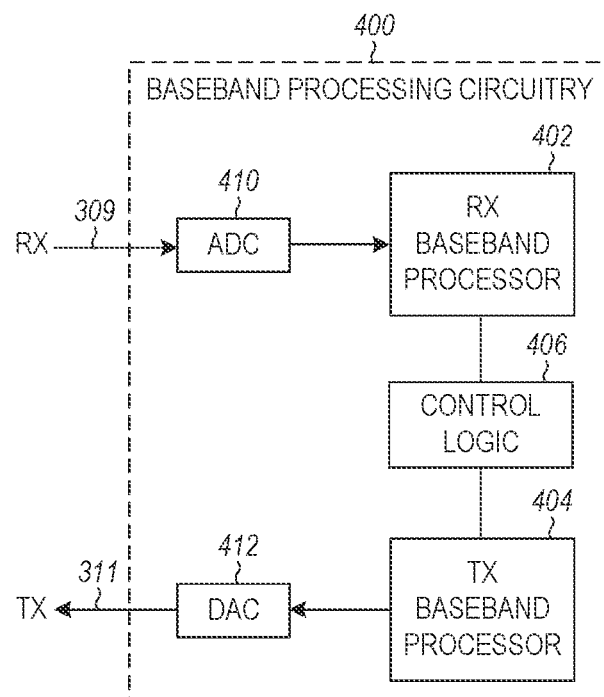
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
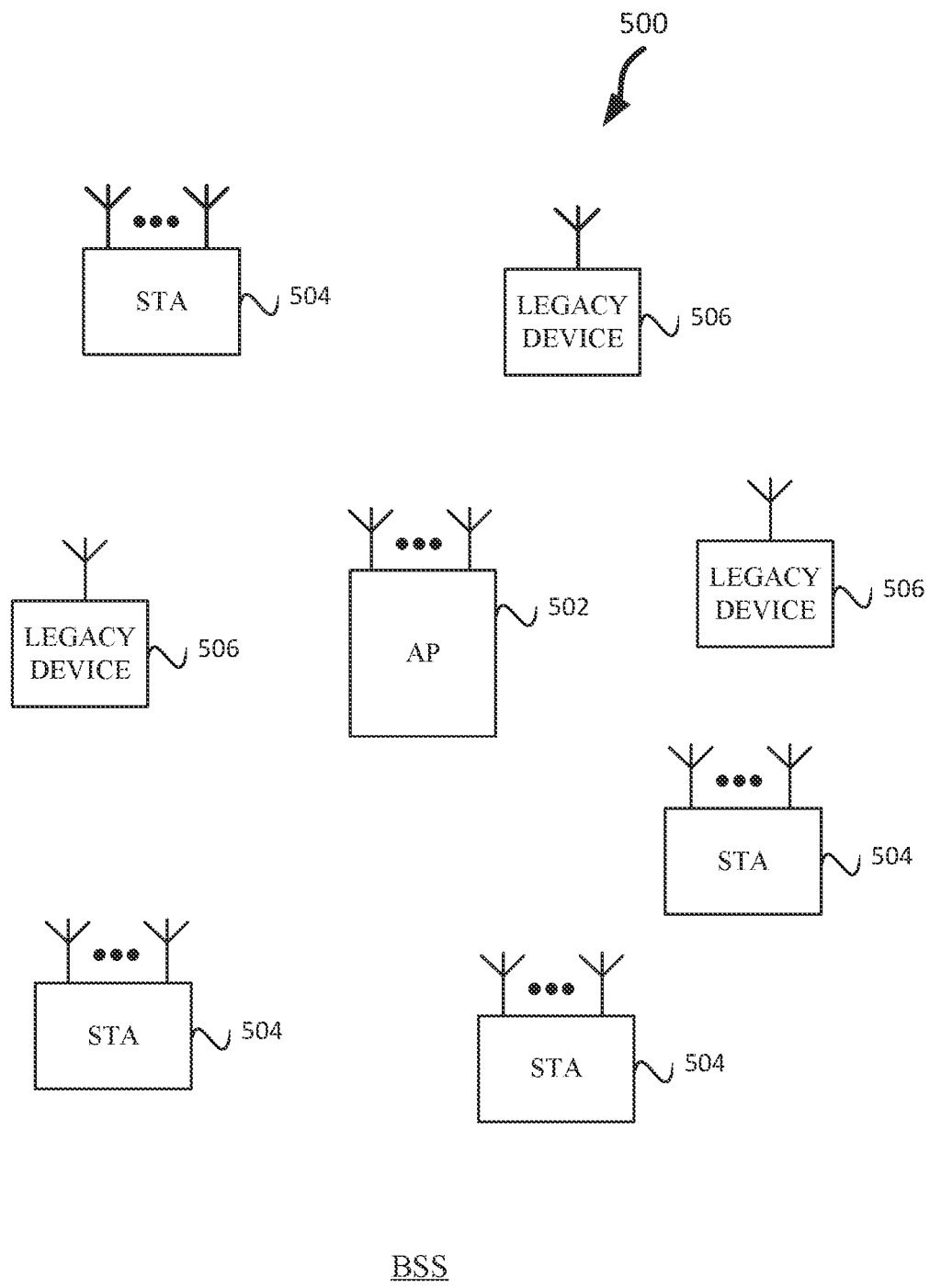
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, a plurality of stations (STAs) 504, and a plurality of legacy devices 506. In some embodiments, the STAs 504 and/or AP 502 are configured to operate in accordance with IEEE 802.11be extremely high throughput (EHT) and/or high efficiency (HE) IEEE 802.11ax. In some embodiments, the STAs 504 and/or AP 520 are configured to operate in accordance with IEEE 802.11az. In some embodiments, IEEE 802.11EHT may be termed Next Generation 802.11.

The AP 502 may be an AP using the IEEE 802.11 to transmit and receive. The AP 502 may be a base station. The AP 502 may use other communications protocols as well as the IEEE 802.11 protocol. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one APs 502 and may control more than one BSS, e.g., assign primary channels, colors, etc. AP 502 may be connected to the internet.

The legacy devices 506 may operate in accordance with one or more of IEEE 802.11 a/b/g/n/ac/ad/af/ah/aj/ay/ax, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11 be or another wireless protocol.

The AP 502 may communicate with legacy devices 506 in accordance with legacy IEEE 802.11 communication techniques. In example embodiments, the H AP 502 may also be configured to communicate with STAs 504 in accordance with legacy IEEE 802.11 communication techniques.

In some embodiments, a HE or EHT frames may be configurable to have the same bandwidth as a channel. The HE or EHT frame may be a physical Layer Convergence Procedure (PLCP) Protocol Data Unit (PPDU). In some embodiments, PPDU may be an abbreviation for physical layer protocol data unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the AP 502, STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g, IEEE 802.11EHT/ax embodiments, a HE AP 502 may operate as a master station which may be arranged to contend for a wireless medium (e.g., during a contention period) to receive exclusive control of the medium for a transmission opportunity (TXOP). The AP 502 may transmit an EHT/HE trigger frame transmission, which may include a schedule for simultaneous UL/DL transmissions from STAs 504. The AP 502 may transmit a time duration of the TXOP and sub-channel information. During the TXOP, STAs 504 may communicate with the AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the AP 502 may communicate with stations 504 using one or more HE or EHT frames. During the TXOP, the HE STAs 504 may operate on a sub-channel smaller than the operating range of the AP 502. During the TXOP, legacy stations refrain from communicating. The legacy stations may need to receive the communication from the HE AP 502 to defer from communicating.

In accordance with some embodiments, during the TXOP the STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or STAs 504 in accordance with legacy IEEE 802.11 communication techniques. In some embodiments, the AP 502 may also be configurable to communicate with STAs 504 outside the TXOP in accordance with legacy IEEE 802.11 or IEEE 802.11EHT/ax communication techniques, although this is not a requirement.

In some embodiments the STA 504 may be a "group owner" (GO) for peer-to-peer modes of operation. A wireless device may be a STA 502 or a HE AP 502.

In some embodiments, the STA 504 and/or AP 502 may be configured to operate in accordance with IEEE 802.11mc. In example embodiments, the radio architecture of FIG. 1 is configured to implement the STA 504 and/or the AP 502. In example embodiments, the front-end module circuitry of FIG. 2 is configured to implement the STA 504 and/or the AP 502. In example embodiments, the radio IC circuitry of FIG. 3 is configured to implement the HE station 504 and/or the AP 502. In example embodiments, the base-band processing circuitry of FIG. 4 is configured to implement the STA 504 and/or the AP 502.

In example embodiments, the STAs 504, AP 502, an apparatus of the STA 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-19.

In example embodiments, the STAs 504 and/or the HE AP 502 are configured to perform the methods and operations/functions described herein in conjunction with FIGS. 1-19. In example embodiments, an apparatus of the STA 504 and/or an apparatus of the AP 502 are configured to perform the methods and functions described herein in conjunction with FIGS. 1-19. The term Wi-Fi may refer to one or more of the IEEE 802.11 communication standards. AP and STA may refer to EHT/HE access point and/or EHT/HE station as well as legacy devices 506.

In some embodiments, a HE AP STA may refer to a AP 502 and/or STAs 504 that are operating as EHT APs 502. In some embodiments, when a STA 504 is not operating as an AP, it may be referred to as a non-AP STA or non-AP. In some embodiments, STA 504 may be referred to as either an AP STA or a non-AP.

In some embodiments, a physical layer protocol data unit (PPDU) may be a physical layer conformance procedure (PLCP) protocol data unit (PPDU). In some embodiments, the AP 502 and STAs 504 may communicate in accordance with one of the IEEE 802.11 standards. IEEE P802.11 be™/D1.0, May 2021, IEEE P802.11-REVmd™/D3.4, March 2020, and IEEE P802.11ax are incorporated herein by reference.

Figure 6:
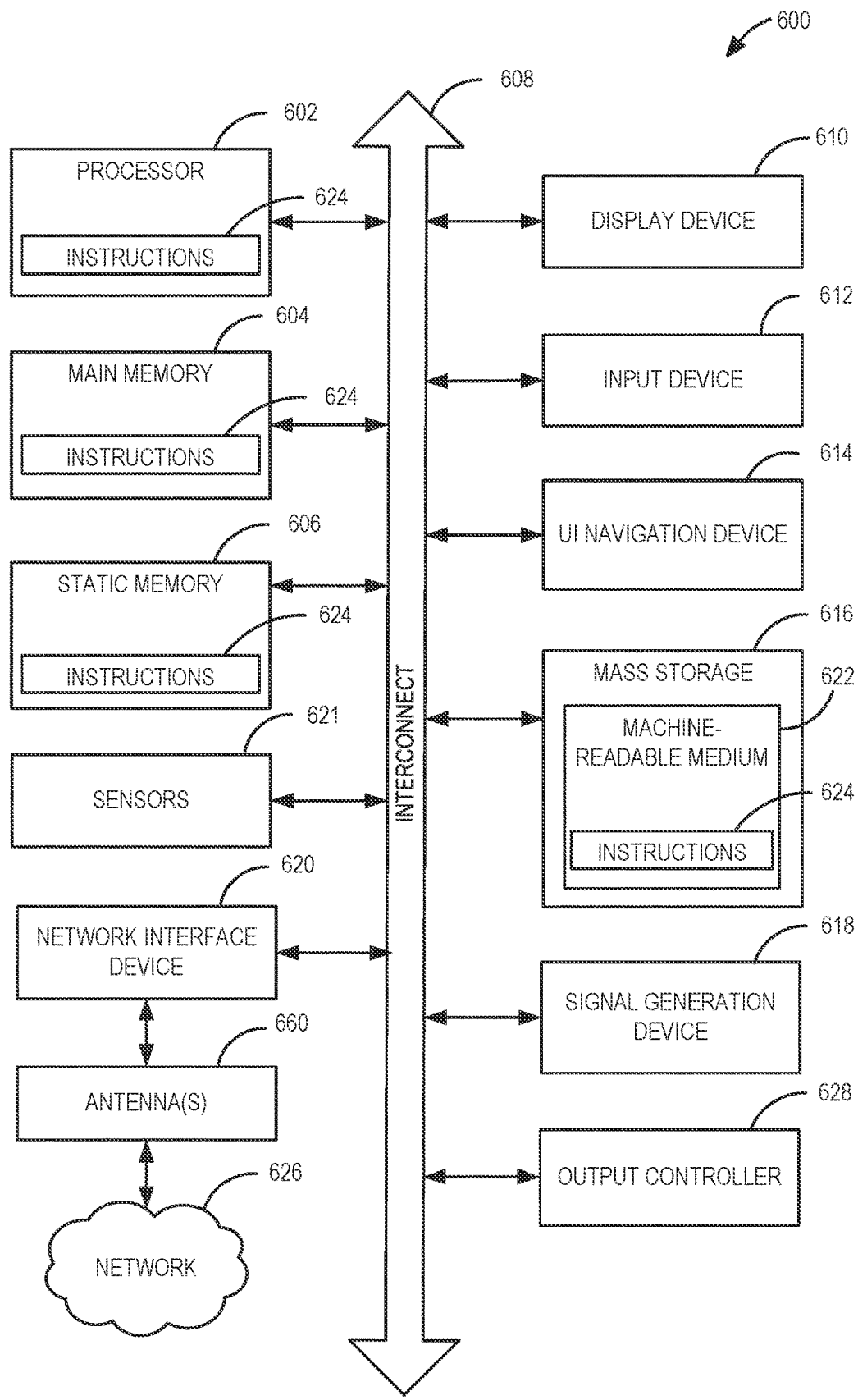
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM), random access memory (RAM); magnetic disk storage media; optical storage media; flash memory, etc.

Figure 7:
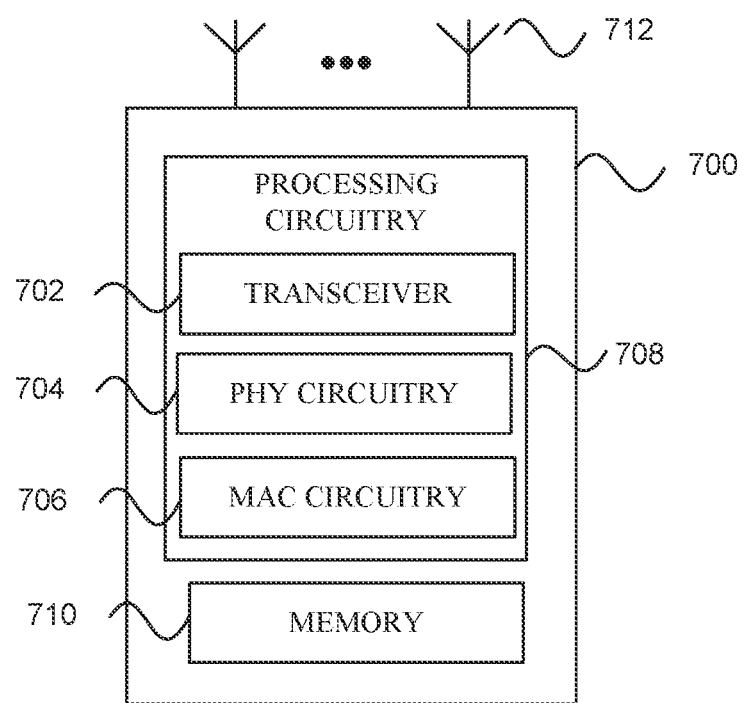
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

A technical problem is how to communicate with STAs and other devices that may only listen to one frequency band at a time but are associated with more than one frequency band. Some embodiments enable MLDs to ensure that STAs and other wireless devices communicating with the MLD do not miss important fields or elements.

Some embodiments provide methods, computer readable media, and apparatuses that enable maintaining in order transmission for individual addressed management frame with a multi-link framework, e.g., MLDs. Some embodiments provide methods, computer readable media, and apparatuses that enable duplicate detection for individual addressed management frame under multi-link framework, e.g., MLDs. Some embodiments provide methods, computer readable media, and apparatuses that enable consistent requests/responses multi-link framework, e.g., MLDs.

Some STAs or other wireless devices communicating with the MLD may be associated with the MLD on several different frequency bands, but only receiving or listening to one frequency band. The MLD and the STA or other wireless device, however, may need to follow procedures communicated on other frequency bands of the MLD. Embodiments include fields or elements transmitted by a first AP of the MLD operating on first frequency band being transmitted by other APs operating on different frequency bands. In this STAs and other wireless devices can follow the procedures, if any, as if the STA or other wireless device received the field or element from the first AP.

Figure 8:
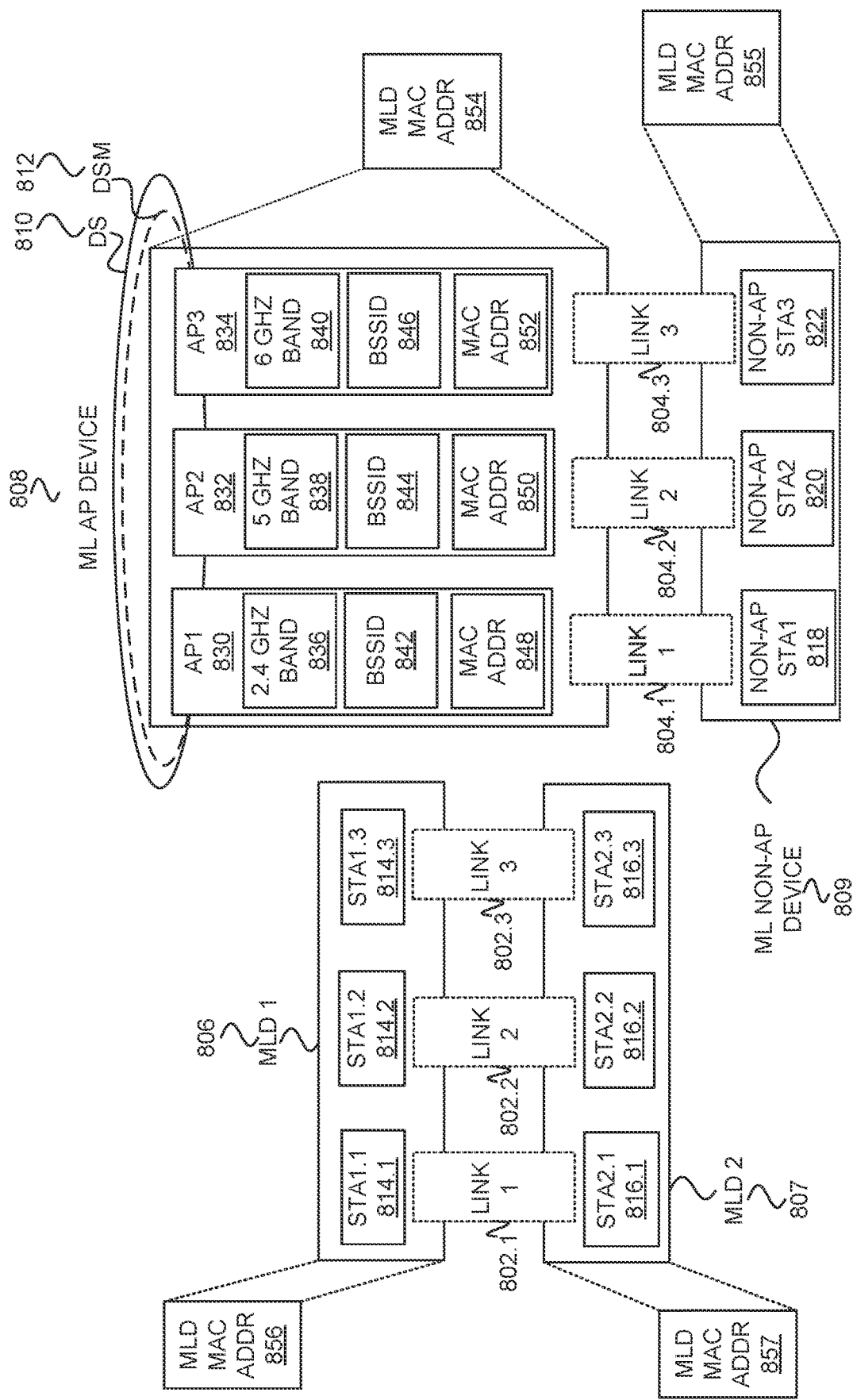
FIG. 8 illustrates MLDs, in accordance with some embodiments.

FIG. 8 illustrates MLDs 800, in accordance with some embodiments. Illustrates in FIG. 8 is MLD 1 806, MLD 2 807, ML AP device entity 808, and ML non-AP device 809. The distribution system (DS) 810 indicates how communications are distributed and the DS medium (DSM) 812 indicates the medium that is used for the DS 810, which in this case is the wireless spectrum.

A MLD is a logical entity that contains one or more STAs. The logical entity has one MAC data service interface and primitives to the logic link control (LLC) and a single address associated with the interface, e.g., MLD MAC address (ADDR) 854, 855, 856, 857, which can be used to communicate on the DSM 812. MLDs 806, 807 allows STAs within the multi-link logical entity to have the same MAC address, e.g., MLD MAC address (ADDR) 854, 855, 856, 857. The name can be changed.

For an infrastructure framework the MLDs may be organized as a ML AP device 808, which includes APs 830, 832, 834 on one side, and a ML non-AP device 809, which includes non-APs STAs 818, 820, 822 on the other side.

In some embodiments, ML AP device 808 comprises STAs where each STA is an EHT AP, e.g., AP 502 or AP1 830, AP2 832, AP3 834. In some embodiments, ML non-AP device 809 is a multi-link device where each STA within the multi-link device is a non-AP EHT STA, e.g., STA 504 or non-AP STA1 818, non-AP STA2 820, non-AP STA3 822. The number of STAs in ML AP device 808, ML non-AP device 809 may be more or fewer.

In some embodiments, STA1 1 814.1, STA1 2 814.2, STA1 3 814.3, STA2 1 816.1, STA2 2 816.2, STA2 3 816.3, AP1 830, AP2 832, AP3 834, non-AP STA1 818, non-AP STA2 820, and/or non-AP STA3 822 are QoS STAs.

In some embodiments, the delivery of MMPDUs is limited by a number of MMPDUs outstanding. In some embodiments, the term outstanding means an MPDU that MPDU contains all or part of an MSDU or MMPDU for which transmission has been started, and for which delivery of the MSDU or MMPDU has not yet been completed (i.e., an acknowledgment of the final fragment or only corresponding MPDU has not been received and the MSDU or MMPDU has not been discarded due to retries, lifetime, or for some other reason). A STA may have any number (greater than or equal to one) of eligible MSDUs outstanding concurrently, subject to the following restrictions. For frames that are not sent within the context of a block ack agreement, a quality of service (QoS) STA shall have outstanding at any time: (1) no more than one MSDU or A-MSDU for each traffic identification (TID) from any particular SA, and no more than one MMPDU transmitted in one or more MPDUs with a particular individual receiver address (RA).

In some embodiments, the retry and duplicate detection for individual addressed management frames is as follows. In some embodiments, a retry rule for MMPDUs is described in the communication standard and is based on retransmit procedures where a Short Retry Counte) (SRC) is associated with each MSDU or MMPDU. Then a retry continues for each failing frame exchange until the transmission is successful or until the retry limit is reached, whichever occurs first. In some embodiments, the retry procedure is a QoS STA shall maintain a short retry counter for each MSDU, A-MSDU, or MMPDU that belongs to a traffic category (TC) that requires acknowledgment.

In some embodiments, after transmitting a frame that requires an immediate acknowledgment, the QoS STA shall perform either of the acknowledgment procedures, as appropriate, that are disclosed in the communication standard IEEE. In some embodiments, the short retry counter for an MSDU or A-MSDU that is not part of a block ack agreement or for an MMPDU shall be incremented every time transmission fails for that MSDU, AMSDU, or MMPDU, including of an associated RTS.

In some embodiments, all retransmission attempts by a non-directional multi-gigabit (DMG) STA for an MPDU with the Type subfield equal to data or management that is not sent under a block ack agreement and that has failed the acknowledgment procedure one or more times shall be made with the Retry subfield, e.g., retry field 920, set to 1.

In some embodiments, retries for failed transmission attempts shall continue until one or more of the following conditions occurs: (1) The short retry count for the MSDU, A-MSDU, or MMPDU is equal to dot11ShortRetryLimit, e.g., short retry limit or retry limit 1004; (2) the short drop-eligible retry count for the MSDU, A-MSDU, or MMPDU is equal to dot11ShortDEIRetryLimit; the long drop-eligible retry count for the MSDU, A-MSDU, or MMPDU is equal to dot11LongDEIRetryLimit; or, the unsolicited retry count for the A-MSDU is equal to dot11UnsolicitedRetryLimit.

In some embodiments, when any of these limits is reached, retry attempts shall cease, and the MSDU, A-MSDU, or MMPDU is discarded. In some embodiments, except for frames belonging to a TID for which block ack agreement is set up, a QoS STA does not initiate the transmission of a management or data frame to a specific RA while the transmission of another management or data frame with the same RA and having been assigned its sequence number from the same sequence counter has not yet completed to the point of success, retry fail, or other MAC discard (e.g., lifetime expiration).

In some embodiments, individually addressed management frames shares sequence number space among different RAs. Individual addressed management frames also share sequence number space with group addressed data and group addressed management frame. A sequence number space is used to determine a sequence number of a MPDU or MMPDU. The sequence number space is randomly set and then incremented to determine a sequence number to use for the MPDU or MMPDU.

Under multi-link framework, e.g., ML AP device 808, ML non-AP device 809, MLD 1 806, MLD 2 807, a technical problem of how to transmit individual addressed management frame across links, e.g., link 1 804.1, link 2 804.2, link 3 804.3 is solved. In some embodiments, individual addressed management frames, i.e., a management frame that is addressed to a single STA, are transmitted in order because there is only one outstanding MMPDU to a specific RA that is permitted at any time. In some embodiments, the STA that receives the individually addressed management frame, termed the receiver, is configured to detect duplicate frames or transmissions.

In some embodiments, multi-link, individual addressed management frames may be transmitted using different links, e.g., 802, 804, where the property of in order delivery and duplicate detection is preserved. The technical problem of request/response management frame exchange over multiple links, e.g., 802, 804, is solved where if the request frame is transmitted using different links, then the response frame is received properly.

The MLD 1 806 includes three STAs, STA.1 814.1, STA1.2 814.2, and STA1.3 814.3 that operate in accordance with link 1 802.1, link 2 802.2, and link 3 802.3, respectively. The links are different frequency bands such as 2.4 GHz band, 5 GHz band, 6 GHz band, and so forth. MLD 2 807 includes STA2.1 816.1, STA2.2 816.2, and STA2.3 816.3 that operate in accordance with link 1 802.1, link 2 802.2, and link 3 802.3, respectively. In some embodiments MLD 1 806 and MLD 2 807 operate in accordance with a mesh network. Using three links enables the MLD 1 806 and MLD 2 807 to operate using a greater bandwidth and more reliably as they can switch to using a different link if there is interference or if one link is superior due to operating conditions.

The distribution system (DS) 810 indicates how communications are distributed and the DS medium (DSM) 812 indicates the medium that is used for the DS 810, which in this case is the wireless spectrum.

ML AP device 808 includes AP1 830, AP2 832, and AP3 834 operating on link 1 804.1, link 2 804.2, and link 3 804.3, respectively. ML AP device 808 includes a MAC address 854 that may be used by applications to transmit and receive data across one or more of AP1 830, AP2 832, and AP3 834.

AP1 830, AP2 832, and AP3 834 includes a frequency band, which are 2.4 GHz band 836, 5 GHz band 838, and 6 GHz band 840, respectively. AP1 830, AP2 832, and AP3 834 includes different BSSIDs, which are BSSID 842, BSSID 844, and BSSID 846, respectively. AP1 830, AP2 832, and AP3 834 includes different media access control (MAC) address (addr), which are MAC adder 848, MAC addr 850, and MAC addr 852, respectively. The AP 502 is a ML AP logical entity 808, in accordance with some embodiments. The STA 504 is a ML non-AP logical entity 809, in accordance with some embodiments.

The ML non-AP device 809 includes non-AP STA1 818, non-AP STA2 820, and non-AP STA3 822. Each of the non-AP STAs may be have MAC addresses and the ML non-AP device 809 may have a MAC address that is different and used by application programs where the data traffic is split up among non-AP STA1 818, non-AP STA2 820, and non-AP STA3 822.

The STA 504 is a non-AP STA1 818, non-AP STA2 820, or non-AP STA3 822, in accordance with some embodiments. The non-AP STA1 818, non-AP STA2 820, and non-AP STA3 822 may operate as if they are associated with a BSS of AP1 830, AP2 832, or AP3 834, respectively, over link 1 804.1, link 2 804.2, and link 3 804.3, respectively.

A Multi-link device such as MLD 1 806 or MLD 2 807, is a logical entity that contains one or more STAs 814, 816. The MLD 1 806 and MLD 2 807 each has one MAC data service interface and primitives to the logical link control (LLC) and a single address associated with the interface, which can be used to communicate on the DSM 812. Multi-link logical entity allows STAs 814, 816 within the multi-link logical entity to have the same MAC address. In some embodiments a same MAC address is used for application layers and a different MAC address is used per link.

In infrastructure framework, ML AP device 808, includes APs 830, 838, 840, on one side, and ML non-AP device 809, which includes non-APs STAs 818, 820, 822 on the other side. ML AP device is a ML logical entity, where each STA within the multi-link logical entity is an EHT AP 502, in accordance with some embodiments. ML non-AP device is a multi-link logical entity, where each STA within the multi-link logical entity is a non-AP EHT STA 504. AP1 830, AP2 832, and AP3 834 may be operating on different bands and there may be fewer or more APs. There may be fewer or more STAs as part of the ML non-AP device 809.

In some embodiments the ML AP device 808 is termed an AP MLD or MLD. In some embodiments ML non-AP device 809 is termed a MLD or a non-AP MLD. Each AP (e.g., AP1 830, AP2 832, and AP3 834) of the MLD sends a beacon frame that includes: a description of its capabilities, operation elements, a basic description of the other AP of the same MLD that are collocated, which may be a report in a Reduced Neighbor Report element or another element such as a basic multi-link element 1600. AP1 830, AP2 832, and AP3 834 transmitting information about the other APs in beacons and probe response frames enables STAs of non-AP MLDs to discover the APs of the AP MLD.

Figure 9:
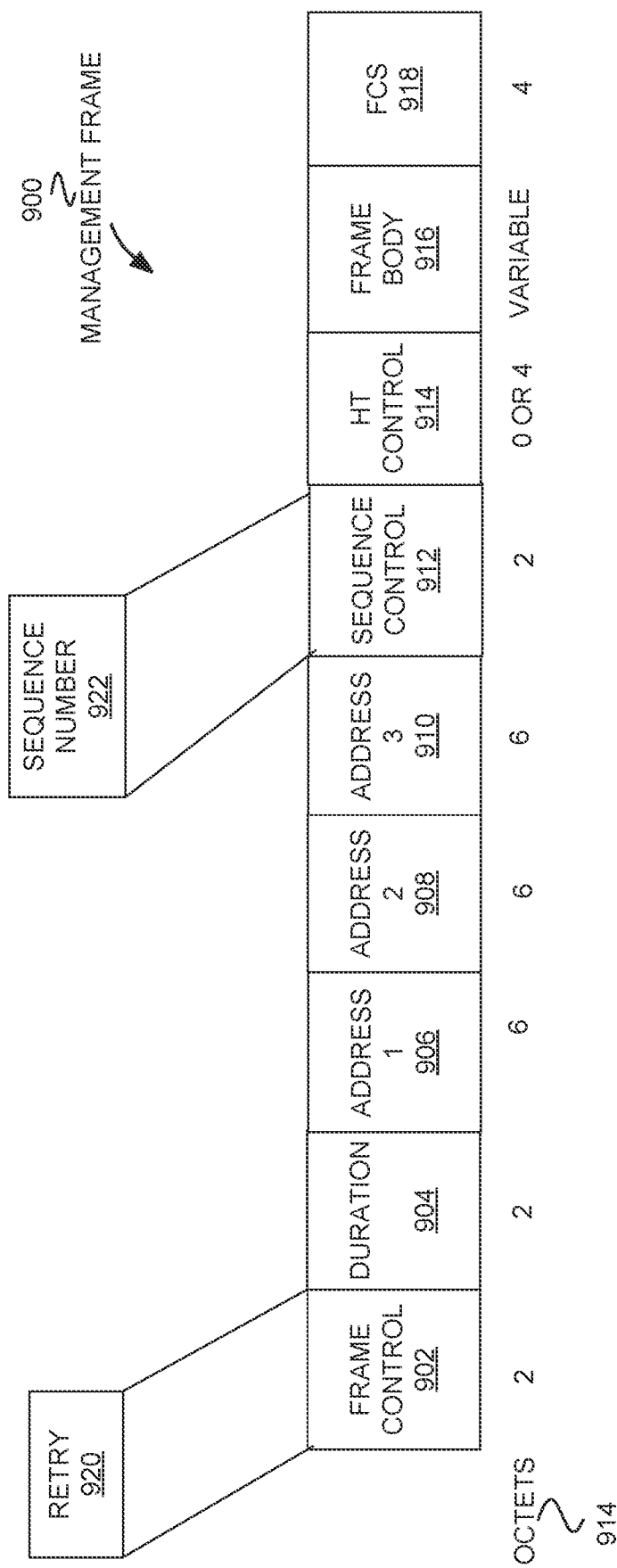
FIG. 9 illustrates a management frame, in accordance with some embodiments.

FIG. 9 illustrates a management frame 900, in accordance with some embodiments. Illustrated in FIG. 9 is frame control 902 field, duration 904 field, address 1 906 field, address 2 908 field, address 3 910 field, sequence control 912 field, HT control 914 field, frame 916 field, FCS 918 field, retry 920 subfield, sequence number 922 subfield, octets 914. The retry 920 subfield may be set to indicate that the management frame 900 is a retransmission of a previous sent management frame. The sequence number indicated by the sequence number 922 subfield is a sequence number used to identify the management frame 900.

Figure 10:
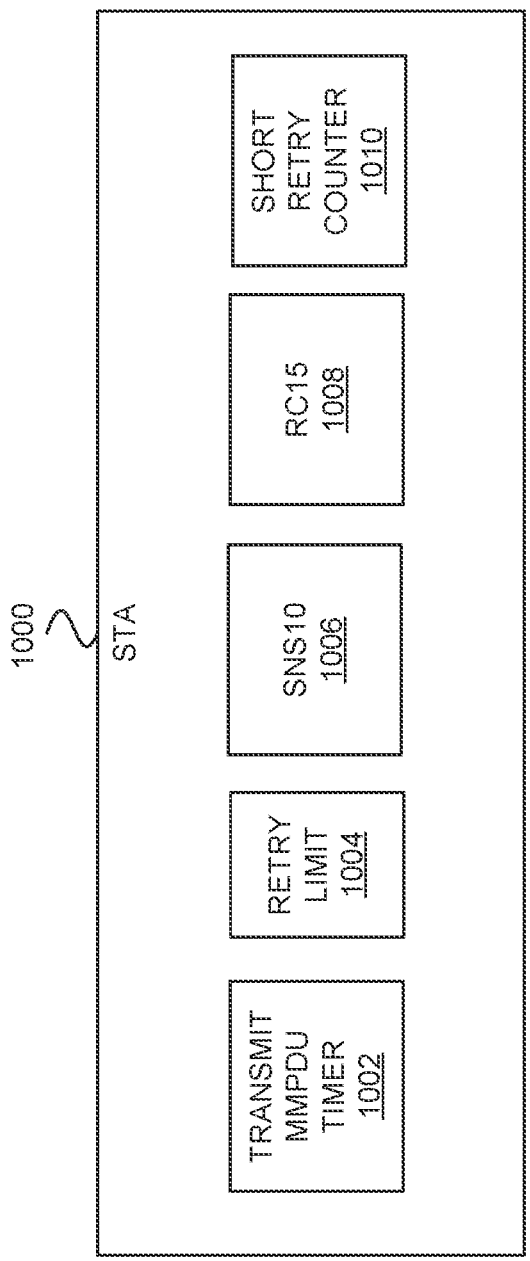
FIG. 10 illustrates a STA, in accordance with some embodiments.

FIG. 10 illustrates a STA 1000, in accordance with some embodiments. The STA 1000 may be a STA 504, AP 502, AP1 830, AP2, 832, AP3 834, non-AP STA1 818, non-AP STA2 820, non-AP STA3 822, ML AP device 808, ML non-AP device 809, STA1 1 814.1, STA1 2 814.2, STA1 3 814.3, MLD 1 806, MLD 2 807, STA2.1 816.1, STA2 2 816.2, and/or STA2 3 816.3.

The STA includes short retry counter 1010, which is described herein. The STA 1000 includes transmit MMPDU timer 1002, retry limit 1004, SNS10 1006, and RC15 1008. Sequence number space (SNS)10 (SNS10) 1006 may be as described in Table 1. SNS10 is shared among AP1 830, AP2, 832, AP3 834 within ML AP device 808, among non-AP STA1 818, non-AP STA2 820, non-AP STA3 822 within ML non-AP device 809, among STA1 1 814.1, STA1 2 814.2, STA1 3 814.3 within MLD 1 806, and among STA2.1 816.1, STA2 2 816.2, STA2 3 816.3 within MLD 2 807, in accordance with some embodiments. Receiver cache (RC) 15 1008 may be as described in Table 2. RC15 is shared among AP1 830, AP2, 832, AP3 834 within ML AP device 808, among non-AP STA1 818, non-AP STA2 820, non-AP STA3 822 within ML non-AP device 809, among STA1 1 814.1, STA1 2 814.2, STA1 3 814.3 within MLD 1 806, and among STA2.1 816.1, STA2 2 816.2, STA2 3 816.3 within MLD 2 807, in accordance with some embodiments.

TABLE 1

Transmitter Sequence Number Space

| Sequence Number Space Identifier | Sequence Number Space | Applies to | Status | Multiplicity | Transmitter Requirements |
|---|---|---|---|---|---|
| SNS10 | Individually addressed Management frame (except the frames that are excluded as listed below (Multi-link device individually addressed Management frame delivery)) | Any STA affiliated with an MLD transmitting an individually addressed Management frame (except the frames that are excluded as below (Multi-link device individually addressed Management frame delivery)) to a STA affiliated with another MLD | Mandatory | Indexed by <MLD MAC Address that the STA identified by Address 1 is affiliated with> per MLD | |

In some embodiments, a transmitting STA shall support the applicable sequence number spaces defined in Table 1 (Transmitter sequence number spaces). An MLD supports the applicable sequence number spaces defined in Table 1 (Transmitter sequence number spaces). A STA affiliated with an MLD supports SNS10 instead of SNS1 in Table 10-5 (Transmitter sequence number spaces) to determine the sequence number of an individually addressed Management frame 900 (except the frames that are excluded as list below (Multi-link device individually addressed Management frame delivery)) that is transmitted to a STA affiliated with another MLD. Applicability is defined by the Applies to column.

The excluded frames are channel state information (CSI) frame, a noncompressed Beamforming frame, a compressed beamforming frame, a very-high throughput (VHT) compressed beamforming frame, a high-efficiency (HE) compressed beamforming/CQI frame, an extremely-high throughput (EHT) compressed beamforming/CQI frame, a probe response frame, a location measurement reporting (LMR) frame, and a fine-timing management (FTM) frame.

In some embodiments, a receiving STA shall implement the applicable receiver requirements defined in Table 2 (Receiver caches) with Status indicated as Mandatory. An MLD shall implement the applicable receiver requirements defined in Table 2 (Receiver caches) with Status indicated as Mandatory. All STAs affiliated with an MLD shall implement MRC14 instead of RC2 in Table 10-6 (Receiver caches) to assist the MLD toin discarding duplicate individually addressed QoS Data frames belonging to a TID without BA negotiation that are delivered transmitted from the STAs affiliated with the associated MLD.(#2751) All STAs affiliated with an MLD with a configuration parameter set (e.g., dot11QMFActivated equal to false) implements RC15 in Table 2 (Receiver caches) to assist the MLD in discarding duplicate individually addressed Management frame (except the frames that are excluded as list above (Multi-link device individually addressed Management frame delivery)) that are transmitted from the STAs affiliated with the associated MLD.

TABLE 2

Receiver Caches

| Receiver cache Identifier | Cache Name | Applies to | Status | Multiplicity Cache size | Receiver Requirements |
|---|---|---|---|---|---|
| RC15 | Individually addressed Management frame (except the frames that are excluded as listed herein (Multi-link device individually addressed Management frame delivery)) | Any STA affiliated with an MLD with dot11QMFActivated equal to false receiving an individually addressed Management frame (except the frames that are excluded as described herein (Multi-link device individually addressed Management frame delivery)) from a STA affiliated with another MLD. | Mandatory | Indexed by <MLD MAC address that theSTA identified by Address 2 is affiliated with, sequence number> per MLD. At least the most recent cache entry per MLD MAC address that the STA identified by Address 2 is affiliatedwith in this cache. | RR74 |

Retry limit 1004 may be a number of retries for sending the individually addressed management frame. Retry limit 1004 is shared among AP1 830, AP2, 832, AP3 834 within ML AP device 808, among non-AP STA1 818, non-AP STA2 820, non-AP STA3 822 within ML non-AP device 809, among STA1 1 814.1, STA1 2 814.2, STA1 3 814.3 within MLD 1 806, and among STA2.1 816.1, STA2 2 816.2, STA2 3 816.3 within MLD 2 807, in accordance with some embodiments.

Transmit MMPDU timer 1002 is a maintained by STAs and APs for transmit MMPDU timer for the MMPDUs, which starts when the MMPDU is passed to the MAC, being below a second threshold, wherein the maintained transmit MMPDU timer starts when the MMPDU is passed to the MAC.

Figure 11:
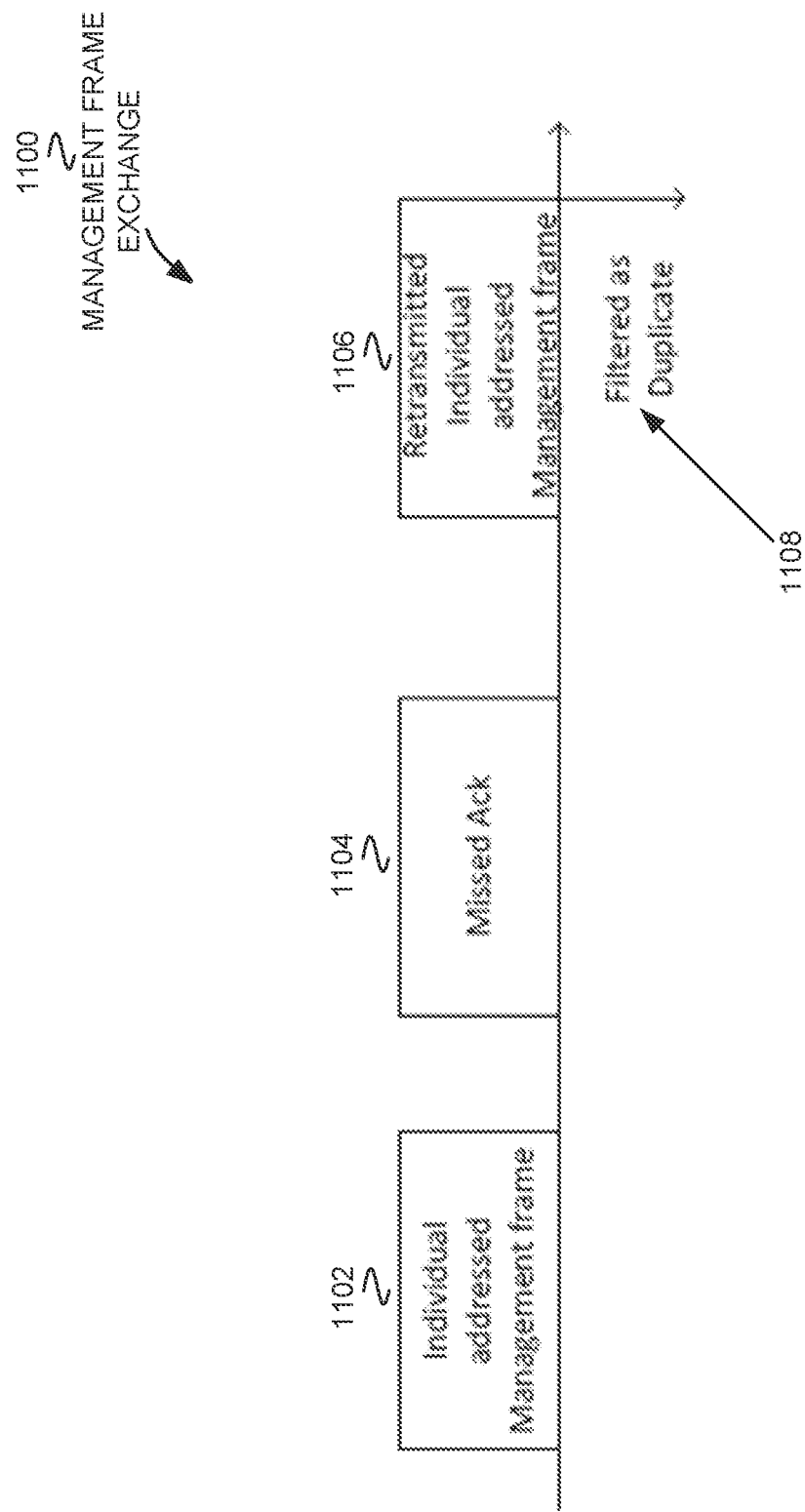
FIG. 11 illustrates a management frame exchange, in accordance with some embodiments.

FIG. 11 illustrates a management frame exchange 1100, in accordance with some embodiments. FIG. 11 illustrates transmission of frames with time progressing from left to right. If an individual addressed management frame 1102 (transmitted by STA 1) is retransmitted 1106 due to a missed acknowledgement (ACK) 1104 (transmitted by STA 2), then the retransmitted individual addressed management frame 1106 will be filtered 1108 by STA 2 as a duplicate.

Figure 12:
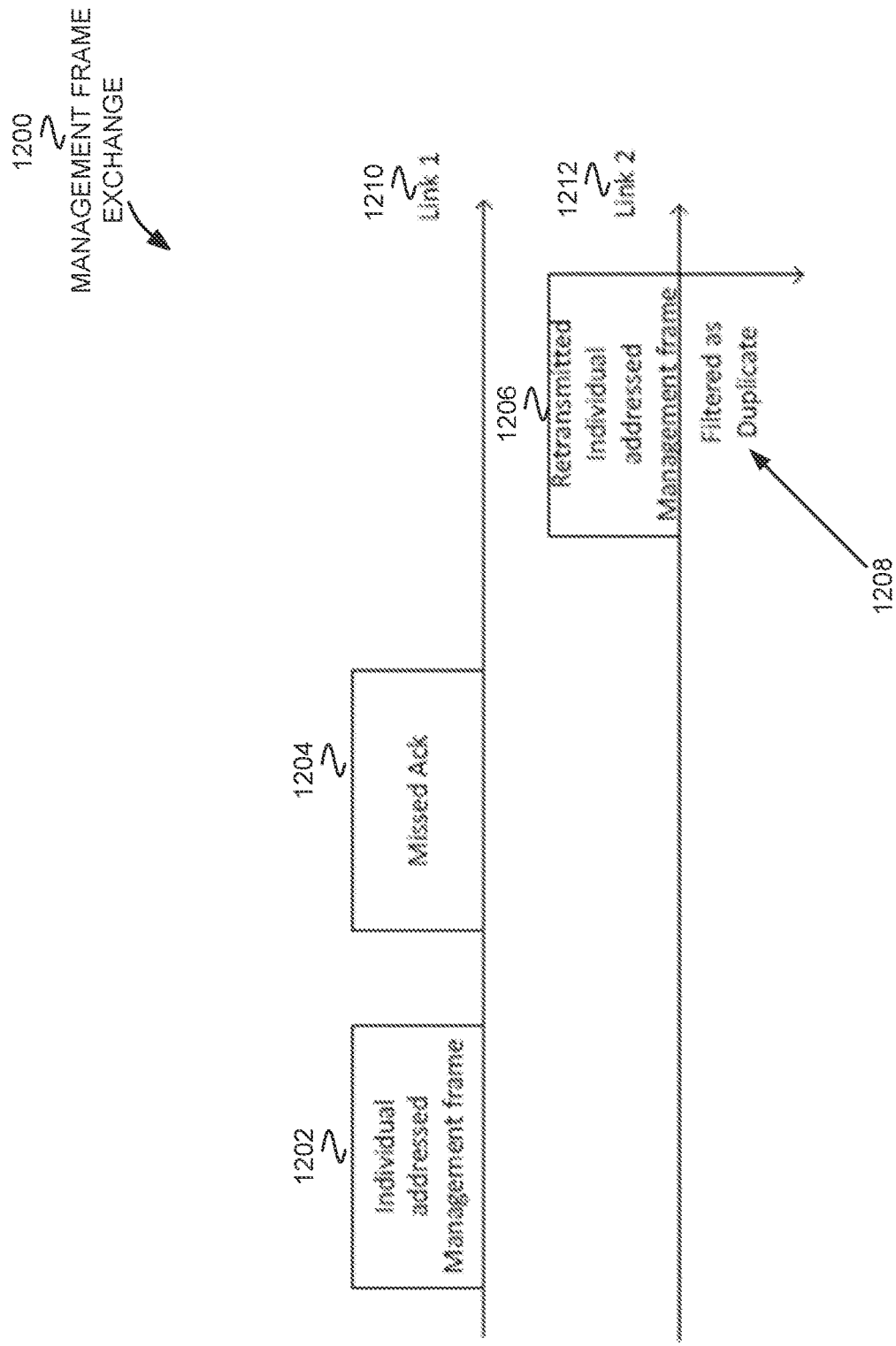
FIG. 12 illustrates a management frame exchange, in accordance with some embodiments.

FIG. 12 illustrates a management frame exchange 1200, in accordance with some embodiments. FIG. 12 illustrates transmission of frames with time progressing from left to right. The individual addressed management frame 1202 is transmitted by STA 1 on link 1 1210 to STA 2. STA 2 transmits an ack 1204, which is missed by STA 1. In some embodiments, in with multi-links, e.g., link 1 1210, and link 2 1212, the retransmitted individual addressed management frame 1206 can be on a different link, link 2 1212, and is filtered as a duplicate 1208.

Figure 13:
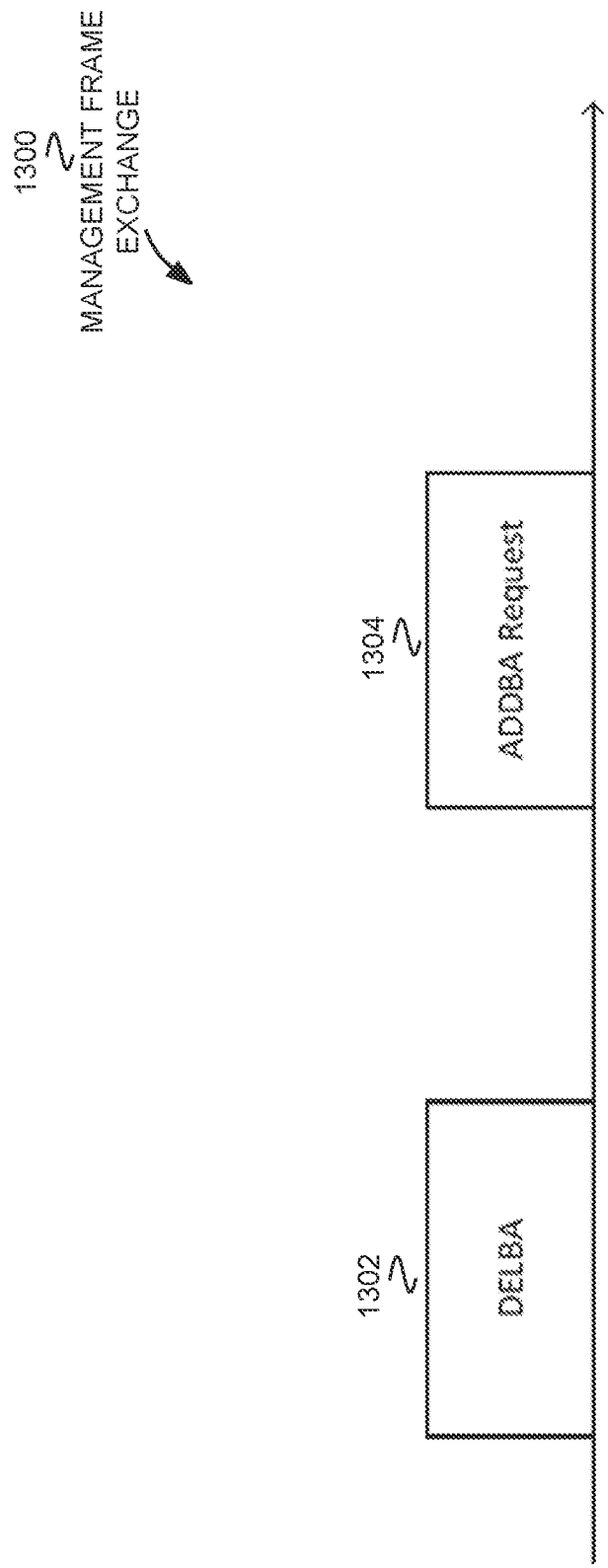
FIG. 13 illustrates a management frame exchange, in accordance with some embodiments.

FIG. 13 illustrates a management frame exchange 1300, in accordance with some embodiments. FIG. 13 illustrates transmission of frames with time progressing from left to right. In some embodiments, a delete block acknowledgement agreement (DELBA) 1302 is transmitted by a STA 1 to delete an existing BA agreement following by another add block acknowledgement (ADDBA) request 1304 transmitted by STA 1. The processing of the 1302 and 1304 needs to be in order for a receiving STA 2.

Figure 14:
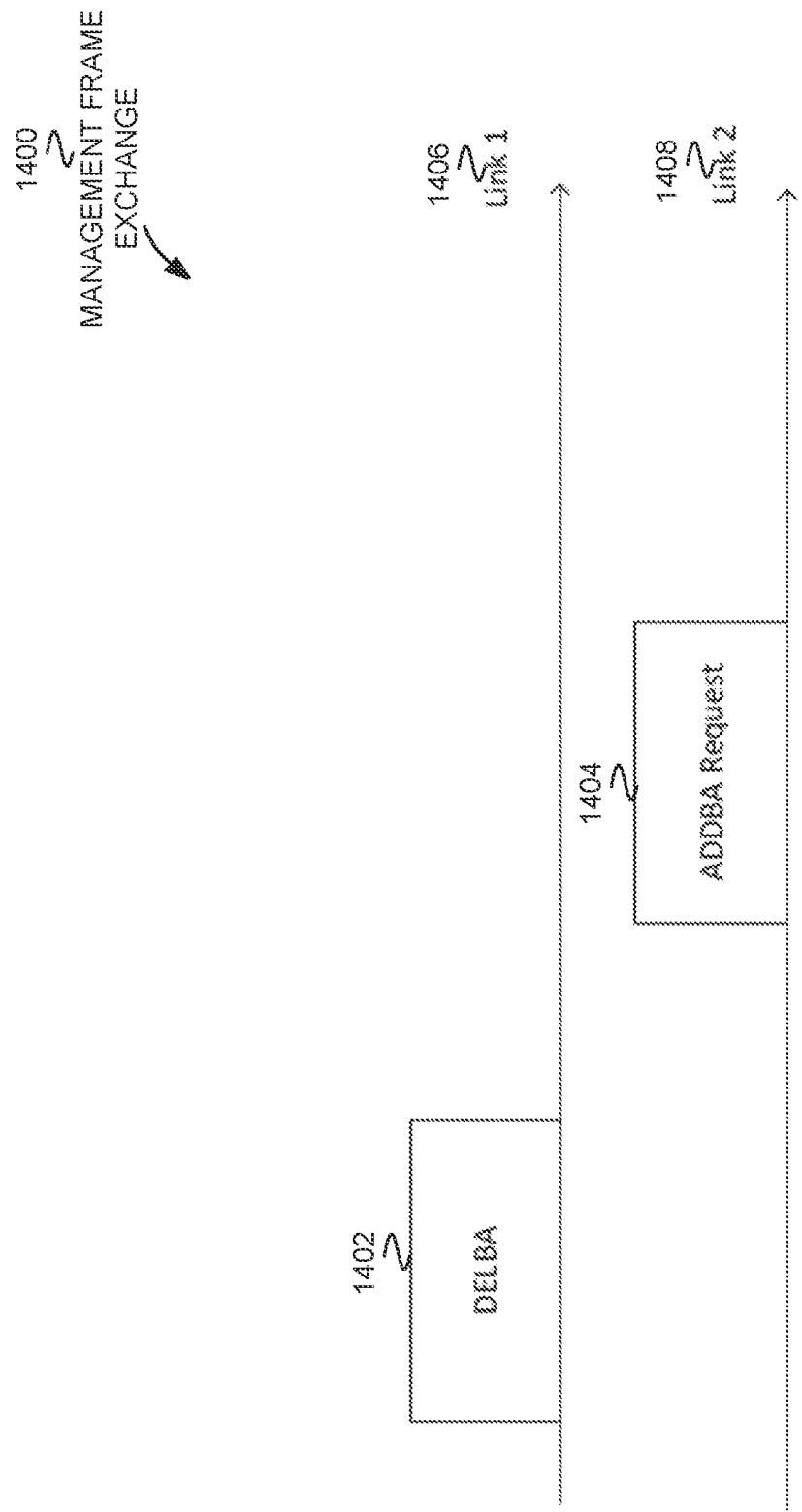
FIG. 14 illustrates a management frame exchange, in accordance with some embodiments.

FIG. 14 illustrates a management frame exchange 1400, in accordance with some embodiments. FIG. 14 illustrates transmission of frames with time progressing from left to right. STA 1 transmits DELBA using a first link 1 1406 to STA 2. STA 1 then transmits ADDBA request 1404 over link 2 1408. may be transmitted to delete existing BA agreement following by another. In accordance with some embodiments, STA 1 and STA 2 are configured to process the frames, 1402, 1404, in order. Out of order processing creates problems in determining the meaning of the frames 1402, 1404.

Figure 15:
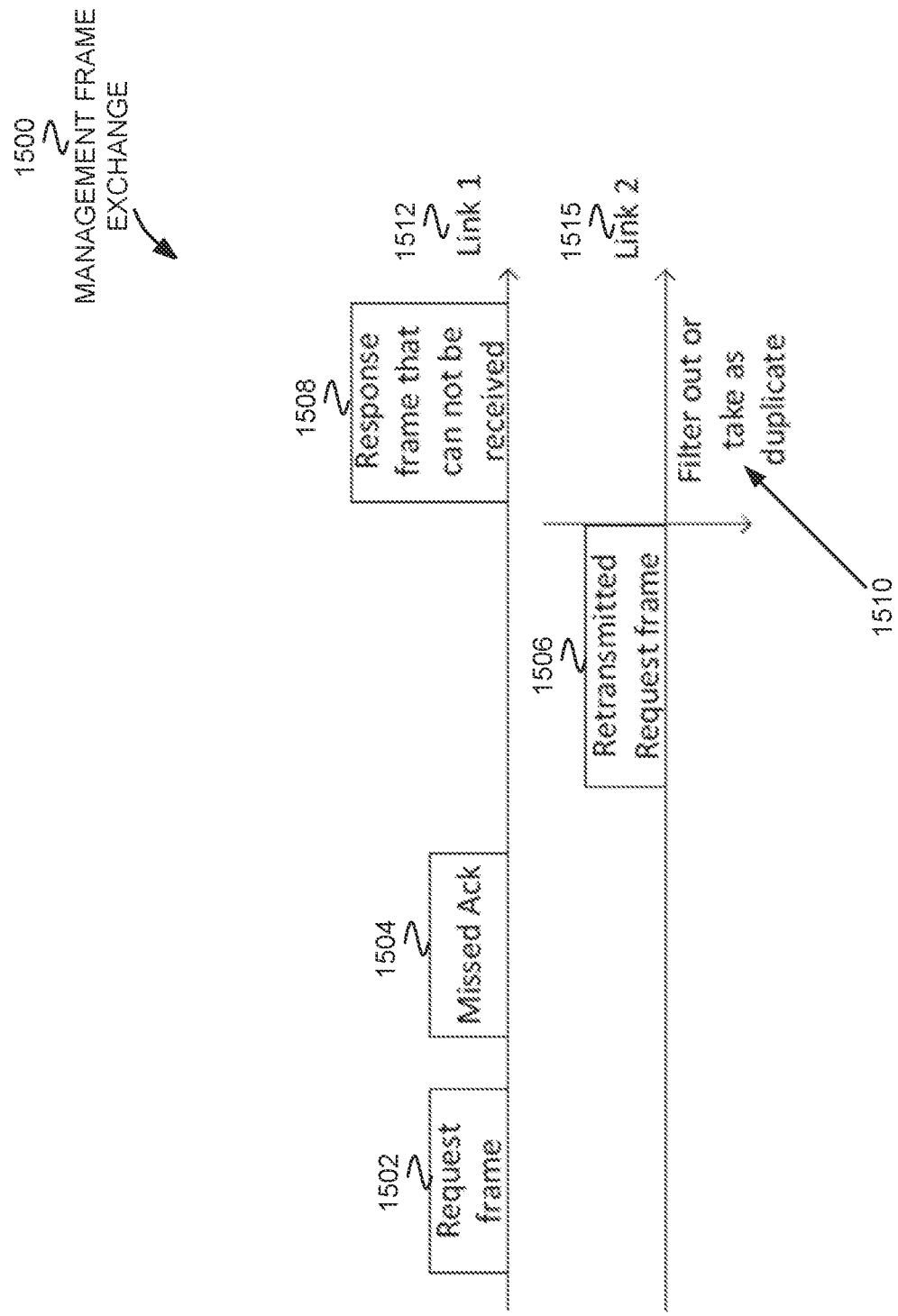
FIG. 15 illustrates a management frame exchange, in accordance with some embodiments.

FIG. 15 illustrates a management frame exchange 1500, in accordance with some embodiments. FIG. 15 illustrates transmission of frames with time progressing from left to right. FIG. 15 illustrates a technical problem of that may occur when the MLD of STA 1 is limited to receiving on one link at a time and an acknowledgement is missed. STA 1 transmits request frame 1502 on link 1 1512. STA 2 transmit an Ack 1504, which is missed by STA 1. STA 1 retransmits the request frame 1506 on Link 2 1515. STA 2 may filter out the retransmitted request frame or take as a duplicate 1510. STA 2 transmit the response frame that can not be received 1508 because STA 1 did not receive the ack 1504. In multi-link scenario, a request frame that requires response frame may be retransmitted in a different link. When the request frame is retransmitted in a different link due to missing Ack, the MLD may not be able to listen to the link that the frame is first transmitted because the MLD of STA 1 may have limited hardware to receive only on one link at a time. At the same time, the peer MLD of STA 2 may send the response frame in the original link, which will be missed. The retransmitted request frame may be now taken as duplicate or filter out due to duplicate.

Figure 16:
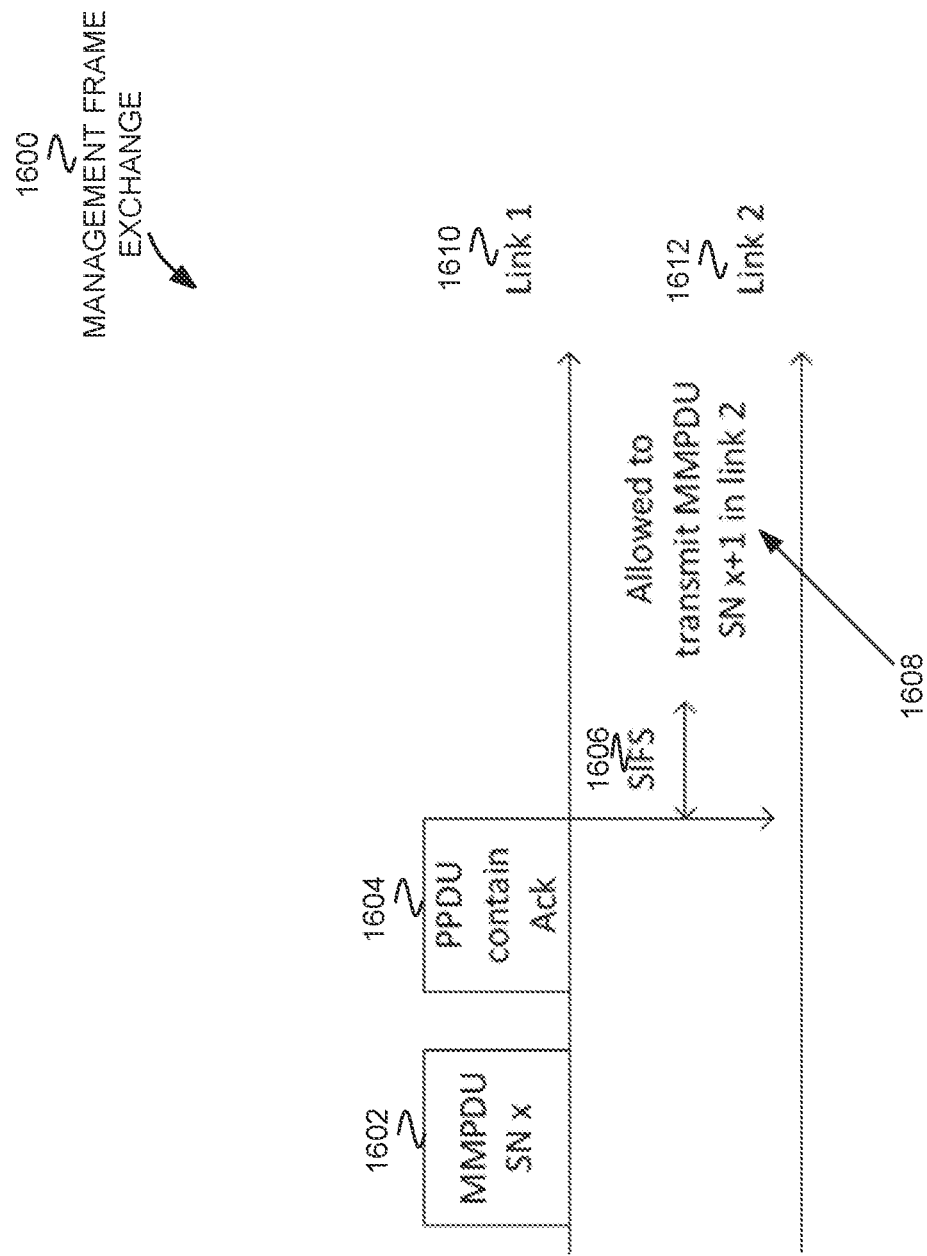
FIG. 16 illustrates a management frame exchange, in accordance with some embodiments.

FIG. 16 illustrates a management frame exchange 1600, in accordance with some embodiments. FIG. 16 illustrates transmission of frames with time progressing from left to right. In FIG. 16 the sequence number space for individual addressed management frame delivery between two MLD is shared among AP1 830, AP2, 832, AP3 834 within ML AP device 808, among non-AP STA1 818, non-AP STA2 820, non-AP STA3 822 within ML non-AP device 809, among STA1 1 814.1, STA1 2 814.2, STA1 3 814.3 within MLD 1 806, and among STA2.1 816.1, STA2 2 816.2, STA2 3 816.3 within MLD 2 807, in accordance with some embodiments.

The QoS STA may be configured to have shared sequence number space for individual addressed management frame delivery between two MLDs. The SN space is shared across links. In some embodiments, the QoS STAs have separate SN space for individual addressed management frame and group addressed data and management frames. In some embodiments, the SN space is be per MLD address across links (one SN space for different receiving MLDs) or just one instance for different MLD address across links (different SN space for different receiving MLDs).

In some embodiments, the transmitter requirement for individual addressed management frame includes (with the exception of a frame belonging to a TID for which block ack agreement) is set up, a MLD does not initiate the transmission of any Management frame to a specific MLD while the transmission of another Management frame with the same MLD and having been assigned its sequence number from the same sequence counter has not yet completed to the point of success, retry fail, or other MAC discard (e.g., lifetime expiration). A transmission is to an MLD if the RA of the transmission is to any affiliated STA of an MLD. To transmit another management frame in link 2 while the transmission of another Management frame with the same MLD yet completed to the point of success in link 1, the transmission in link 2 starts after the reception of the PPDU that contains the acknowledgement in link 1. Additional SIFS can be added, in accordance with some embodiments.

FIG. 16 illustrates that a STA 1 transmits MMPDU SN x 1602 and receives a PPDU containing an Ack 1604. A SIFS 1606 duration after the PPDU containing an ACK 1604 another MMPDU with SN x+1 may be transmitted by a STA 2 on link 2 1612. So, STA 2 must wait to transmit an individually addressed management frame (MMPDU) on link 2 1612 until the current MMPDU transmitted on link 1 1610 is completed. The SN is determined from SNS10 1006 where a random number is assigned SNS10 1006 and then the number is incremented modulo a number for new sequence numbers for the individually addressed management frames.

For frames that are not sent within the context of a block ack agreement, a MLD is configured to have outstanding at any time: no more than one MMPDU transmitted in one or more MPDUs to a particular MLD; no more than one MSDU or A-MSDU for each TID from any particular SA; and, where the term outstanding refers to an MPDU containing all or part of an MSDU or MMPDU for which transmission has been started, and for which delivery of the MSDU or MMPDU has not yet been completed (i.e., an acknowledgment of the final fragment or only corresponding MPDU has not been received and the MSDU or MMPDU has not been discarded due to retries, lifetime, or for some other reason).

In some embodiments, an MLD or STA is configured to maintain a short retry counter 1010 (e.g., for each MSDU, A-MSDU, or MMPDU that belongs to a TC that requires acknowledgment. In some embodiments, an MLD or STA sets retry 920 bits of MPDU that transmits each MSDU, A-MSDU, or MMPDU, which is not under block ack agreement, to 1 when transmits the MSDU, A-MSDU, or MMPDU across links. In some embodiments, an MLD or STA retries for failed transmission attempts shall continue until the short retry count 1010 for the MSDU, A-MSDU, or MMPDU is equal to a threshold (e.g., dot11 ShortRetryLimit.) In some embodiments, an MLD or STA when any of these limits is reached, retry attempts shall cease, and the MSDU, A-MSDU, or MMPDU shall be discarded.

An MLD or STA receiver requirement for individual addressed management frame includes maintain a separate cache indexed by <peer MLD address, sequence number, fragment number> for individual addressed management frame across links (as described in Table 2); update the most recent cache when any STAs in MLD received any individual addressed management frame from peer MLD, i.e., TA matches any MAC address of the STA affiliated with the peer MLD; and, drop a MMPDU if the received frame has retry bit set and matches the cache record, in accordance with some embodiments.

In some embodiments, an MLD or a STA is configured so that the (Re)Association Response frame shall be sent to the non-AP STA affiliated with the non-AP MLD that sent the (Re)Association Request frame.

An MLD shall continue to deliver the failed individually addressed QoS Data frame belonging to a TID without block ack negotiation to an associated MLD on the setup links subject to additional constraints ((Link management)) until any of the following conditions occur: the retry limit is met, the transmit MSDU timer for the MSDU exceeds a threshold, e.g., dot11EDCATableMSDULifetime, or the individually addressed QoS Data frame is successfully delivered.

A STA affiliated with the MLD shall not transmit other individually addressed QoS Data frames belonging to the TID without block ack negotiation to another STA affiliated with the associated MLD while the current individually addressed QoS Data frame belonging to the TID without block ack negotiation has not yet completed to the point of success, retry fail, or other MAC discard (e.g., lifetime expiration).

For BSS transition, the Current AP Address field is the MAC address of the AP with which the STA is currently associated. For ML transition, if the current association is between a non-AP MLD and an AP MLD, then the Current AP Address field is the MLD MAC address of the AP MLD with which the non-AP MLD is currently associated. For ML transition, if the current association is between a non-AP STA and an AP, then the Current AP Address field is the MAC address of the AP with which the STA is currently associated. The length of the Current AP Address field is 6 octets.

An MLD with dot11QMFActivated equal to false shall continue to deliver the failed individually addressed Management frame (except the frames that are excluded above) to an associated MLD on the setup links subject to additional constraints until any of the following conditions occur: the retry limit is met; the transmit MMPDU timer for the MMPDU exceeds a threshold (e.g., dot11EDCATableMSDULifetime); or, the individually addressed Management frame is successfully delivered.

A STA affiliated with the MLD with dot11QMFActivated equal to false shall not transmit other individually addressed Management frames (except the frames that are excluded above) to another STA affiliated with the associated MLD while the current individually addressed Management frame (except the frames that are excluded above) has not yet completed to the point of success, retry fail, or other MAC discard (e.g., lifetime expiration).

Figure 17:
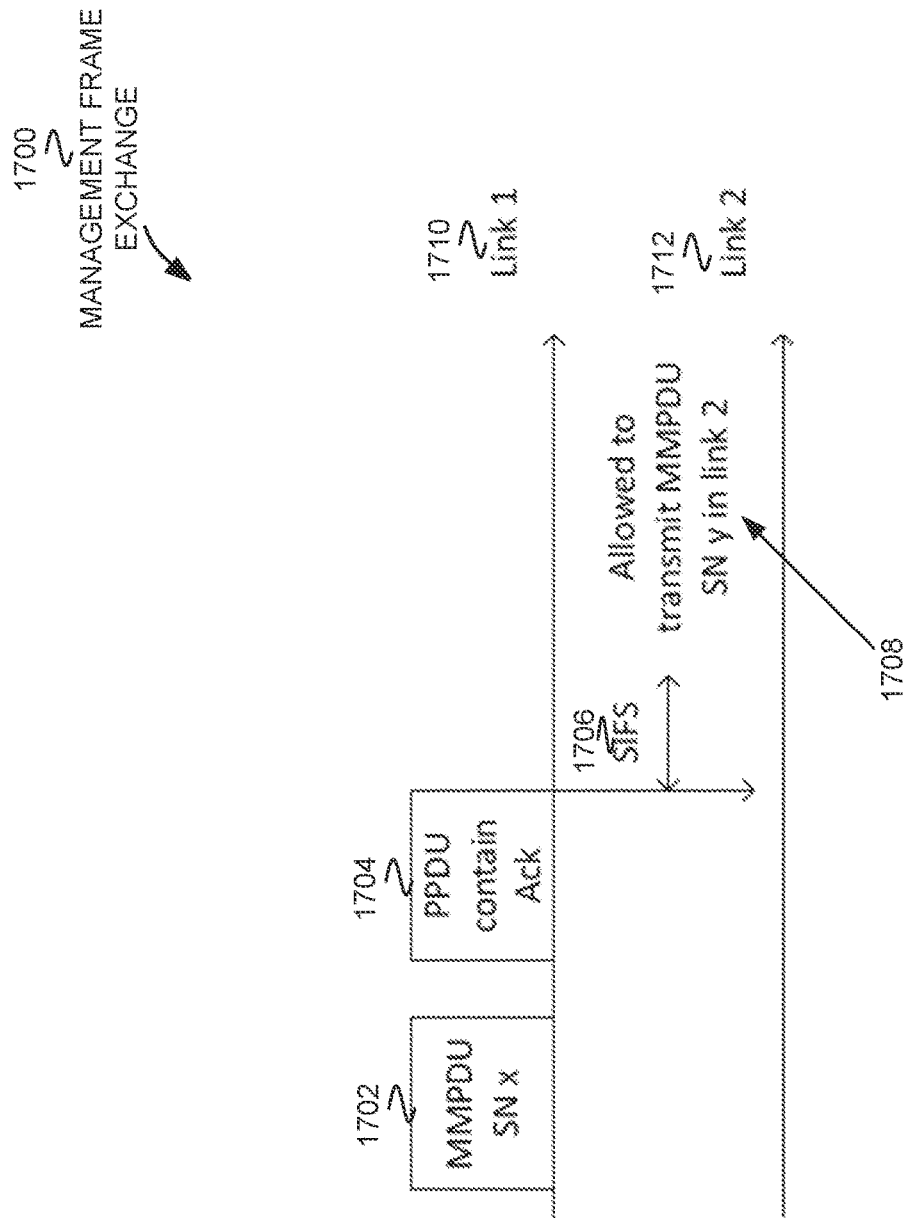
FIG. 17 illustrates a management frame exchange, in accordance with some embodiments.

FIG. 17 illustrates a management frame exchange 1600, in accordance with some embodiments. FIG. 17 illustrates transmission of frames with time progressing from left to right. FIG. 17 illustrates an alternative embodiment where a non-shared sequence number space is used for individual addressed management frame delivery between two MLDs. Each STA of a MLD maintains different SN space used for group addressed management frame, group addressed data frame, and individual addressed management.

A transmitter STA is configured for for individual addressed management frame. (with the exception of a frame belonging to a TID for which block ack agreement is set up), a MLD shall not initiate the transmission of any individual addressed Management frame to a specific MLD while the transmission of another individual addressed Management frame with the same MLD has not yet completed to the point of success, retry fail, or other MAC discard (e.g., lifetime expiration). So the sequence numbers may be different. A transmission is to an MLD if the RA of the transmission is to any affiliated STA of an MLD. To prevent transmitting another individual addressed management frame in link 2 while the transmission of another individual addressed Management frame with the same MLD is not yet completed to the point of success on link 1 1710 (transmission of MMPDU SN x 1702), the transmission in link 2 1712 starts after the reception of the PPDU 1704 that contains the acknowledgement in link 1 1710. A SIFS 1706 can be added as a requirement before beginning transmission of another MMPDU with SN y on link 2 1712. The MMPDUs are a class of MMPDUs, which includes all management frame with operation that impact not just the link that the management frame is transmitted to including the following DELBA, DELTS, Disassociation, ADDBA request/response, ADDTS request/response, Authentication request/response, and an Association request/response.

For frames that are not sent within the context of a block ack agreement, a MLD is configured to have outstanding at any time: no more than one MMPDU transmitted in one or more MPDUs to a particular MLD. In some embodiments, no more than one MMPDU is transmitted in one or more MPDUs to a particular MLD for a class of MMPDUs, where the class of MMPDUs includes all management frame with operation that impact not just the link that the management frame is transmitted to including but not limited to DELBA, DELTS, Disassociation, ADDBA request/response, ADDTS request/response, Authentication request/response, and an Association request/response. No more than one MSDU or A-MSDU for each TID from any particular SA is transmitted. The term outstanding refers to an MPDU containing all or part of an MSDU or MMPDU for which transmission has been started, and for which delivery of the MSDU or MMPDU has not yet been completed (i.e., an acknowledgment of the final fragment or only corresponding MPDU has not been received and the MSDU or MMPDU has not been discarded due to retries, lifetime, or for some other reason). The MMPDU that is transmitted in one link and not successfully delivered due to no acknowledgement reception is not retransmitted in a different link. The receiver STA may be configured as follows for individual addressed management frames. A MLD maintains separate cache in each link for detection of duplicate individual addressed management frame indexed by <Address 2, sequence number, fragment number>. An MLD maintains separate replay counter in each link for replay check for protected individual addressed management frame.

Figure 18:
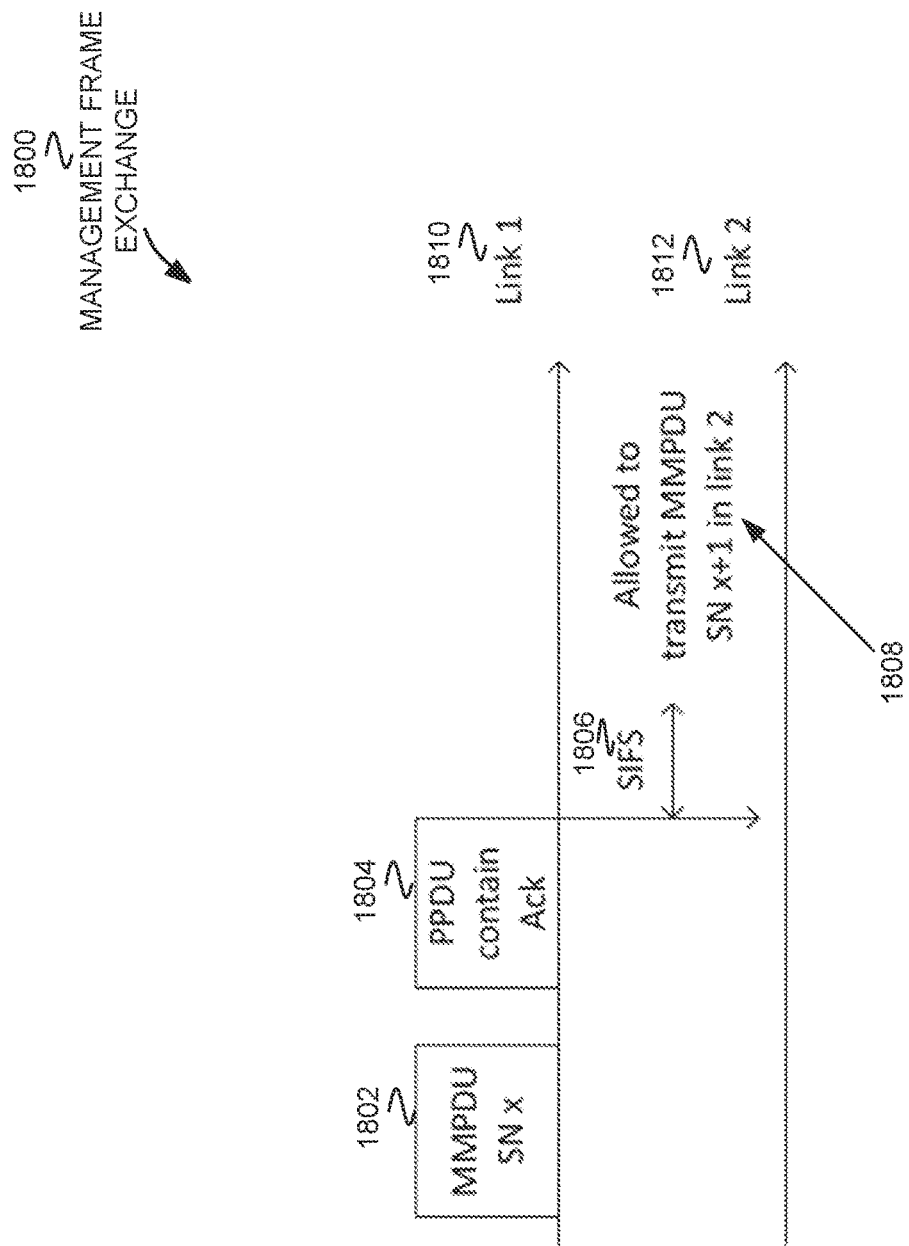
FIG. 18 illustrates a management frame exchange, in accordance with some embodiments.

FIG. 18 illustrates a management frame exchange 1600, in accordance with some embodiments. FIG. 18 illustrates transmission of frames with time progressing from left to right. In some embodiments, an MLD and/or STA has two categories of individual addressed management frame.

Category 1: management frame that is used to enable MLD level operations (ex. ADDBA/DELBA) or is used to enable operations for the links that is not the link used to transmit the management frame (ex. management frame that negotiates TWTs for two links). Category 1 has the need to be retransmitted across links, and we need duplicate detection. Category has the requirement of in order delivery. Category 2: management frame that are not category 1. Category 2 does not need duplicate detection, in order delivery, or retransmission across links.

For management frame in category 1, a shared SN space and separate delivery rule are used. For management frame in category 2, a shared SN space is not necessary, and per link delivery rule can follow baseline operation.

Category 1 is a management frame that is used to enable MLD level operations (ex. ADDBA/DELBA) or is used to enable operations for the links that is not the link used to transmit the management frame (ex. management frame that negotiates TWTs for two links). A category 1 individual addressed management frame includes but not limited to DELBA, DELTS, Disassociation, ADDBA request/response, ADDTS request/response, Authentication request/response, Association request/response, TWT negotiation frame, and a Management frame that includes signaling for operations of a link that is not the link used to transmit the management frame.

Category 1 management frame requires in order delivery between two category 1 management frames across links. Category 1 management frame allows retransmission in different links. Category 1 management frame has duplicate detection on receiver side. Category 2 management frame that are not category 1. Category 2 management frame only needs in order delivery between two category 2 management frames in each link. Category 2 management frame does not allow retransmission in different links. An MLD and/or STA are configured for duplicate detection and in order delivery for category 1 management frame across links. An MLD and/or STA uses shared sequence number space for individual addressed management frame delivery in category 1 between two MLDs; and, the SN space is shared across links. In some embodiments, MLDs and/or STAs have separate SN space for individual addressed management frame and group addressed data and management frame. The SN space can be per MLD address across links (one SN space for different receiving MLDs) or just one instance for different MLD address across links (different SN space for different receiving MLDs).

MLDs and/or STA transmitters are configured to for individual addressed management frame in category 1 (with the exception of a frame belonging to a TID for which block ack agreement is set up), a MLD shall not initiate the transmission of any individual addressed Management frame in category 1 to a specific MLD while the transmission of another Management frame in category 1 with the same MLD and having been assigned its sequence number from the same sequence counter has not yet completed to the point of success, retry fail, or other MAC discard (e.g., lifetime expiration). A transmission is to an MLD if the RA of the transmission is to any affiliated STA of an MLD. To transmit another management frame in category 1 in link 2 1812 (referring to FIG. 18) while the transmission of another Management frame (e.g., MMPDU SN x 1802) in category 1 with the same MLD yet completed to the point of success in link 1 1810, the transmission in link 2 1812 starts after the reception of the PPDU that contains the acknowledgement (e.g., PPDU contain Ack 1804) on link 1 1810. A SIFS 1808 duration may be required before the start of the transmission.

A MLD has no more than one outstanding MMPDU transmitted in one or more MPDUs to a particular MLD. The term outstanding refers to an MPDU containing all or part of a MMPDU for which transmission has been started, and for which delivery of the MMPDU has not yet been completed (i.e., an acknowledgment of the final fragment or only corresponding MPDU has not been received and the MMPDU has not been discarded due to retries, lifetime, or for some other reason).

A Management frame in category 1 can be retransmitted on any link. An MLD maintains a short retry counter for each MMPDU that belongs to a TC that requires acknowledgment. A MLD sets retry bits of MPDU that transmits each MMPDU to 1 when transmits the MSDU, A-MSDU, or MMPDU across links. Retries for failed transmission attempts shall continue until the short retry count for the MMPDU is equal to a threshold, e.g., dot11ShortRetryLimit. When any of these limits is reached, retry attempts shall cease, and the MMPDU shall be discarded.

MLD and/or STA receiver requirement for individual addressed management frame are as follows: maintain a separate cache indexed by <peer MLD address, sequence number, fragment number> for individual addressed management frame in category 1 across links; update the most recent cache when any STAs in MLD received any individual addressed management frame in category 1 from peer MLD, i.e., TA matches any MAC address of the STA affiliated with the peer MLD; and, drop a MMPDU if the received frame has retry bit set and matches the cache record.

MLDs and/or STA do not use shared sequence number space for individual addressed management frame delivery in category 2 between two MLDs.

Each STA of a MLD maintains different SN space used for group addressed management frame, group addressed data frame, and individual addressed management. Transmitter MLDs and/or STAs will for individual addressed management frame in category 2 what is transmitted in one link and not successfully delivered due to no acknowledgement reception will not be retransmitted in a different link.

An MLD will not initiate the transmission of any individual addressed Management frame in category 2 to a specific MLD while the transmission of another individual addressed Management frame with the same MLD has not yet completed to the point of success, retry fail, or other MAC discard (e.g., lifetime expiration) in the same link. At each link, a MLD shall have outstanding at any time no more than one MMPDU transmitted in one or more MPDUs to the peer MLD in the link. The term outstanding refers to an MPDU containing all or part of an MMPDU for which transmission has been started, and for which delivery of the MMPDU has not yet been completed (i.e., an acknowledgment of the final fragment or only corresponding MPDU has not been received and the MMPDU has not been discarded due to retries, lifetime, or for some other reason).

Receiver MLDs and/or STA are configured to for individual addressed management frame maintain separate cache in each link for detection of duplicate individual addressed management frame indexed by <Address 2, sequence number, fragment number>, and maintain separate replay counter in each link for replay check for protected individual addressed management frame.

Figure 19:
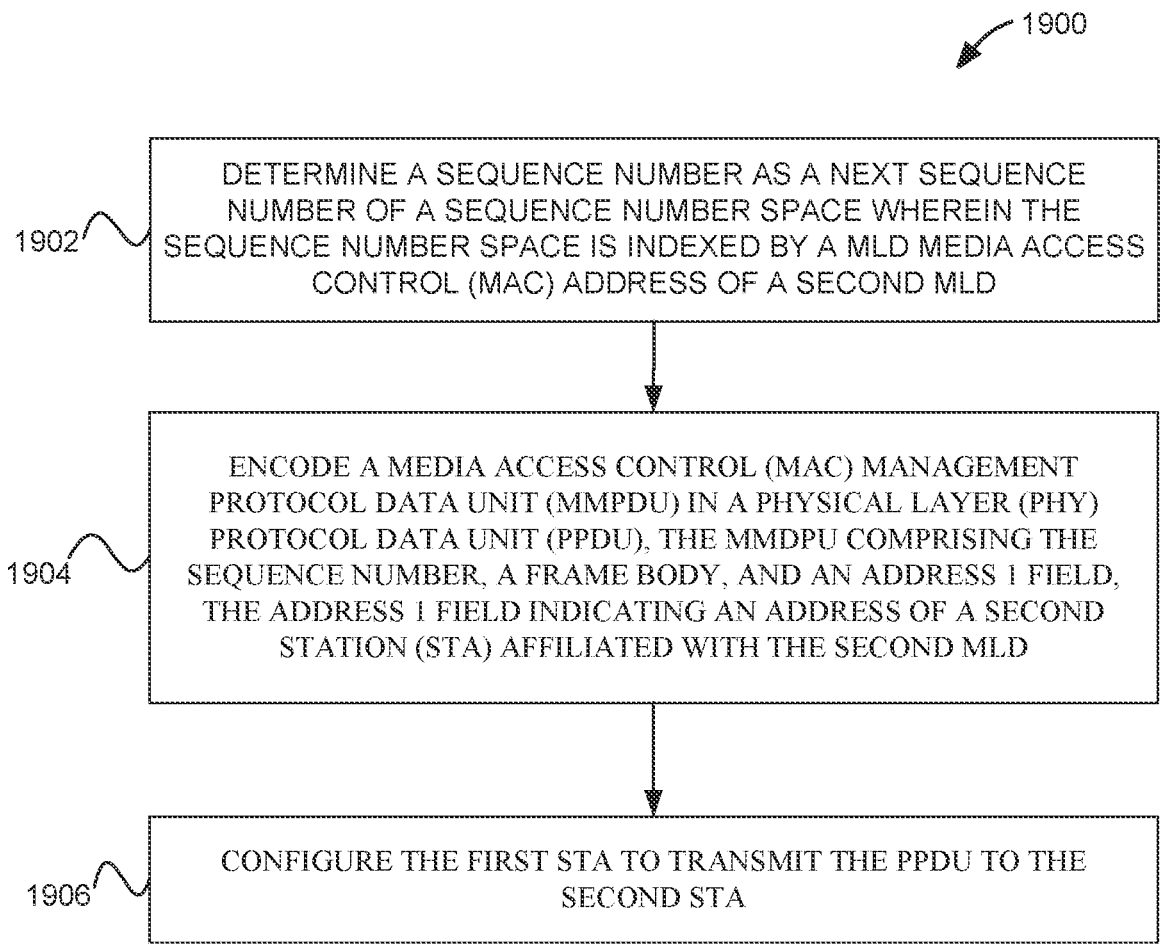
FIG. 19 illustrates a method for multi-link frame delivery, in accordance with some embodiments.

FIG. 19 illustrates a method 1900 for multi-link frame delivery, in accordance with some embodiments. The method 1900 begins at operation 1902 with determining a sequence number as a next sequence number of a sequence number space wherein the sequence number space is indexed by a MLD MAC address of a second MLD. For example, AP1 830, AP2 832, AP3 834, non-AP STA1 818, non-AP STA2 820, or non-AP STA3 822 may determine a next sequence number using SNS10 1006.

The method 1900 continues at operation 1904 with encoding a MMPDU in a PPDU, the MMDPU comprising the sequence number, a frame body, and an address 1 field, the address 1 field indicating an address of a second station (STA) affiliated with the second MLD. For example, AP1

830, AP2 832, AP3 834, non-AP STA1 818, non-AP STA2 820, or non-AP STA3 822 may encode management frame 900 with sequence number 922. The management frame 900 may be encoded in a PPDU.

The method 1900 continues at operation 1906 with configuring the first STA to transmit the PPDU to the second STA. For example, an apparatus may configure AP1 830, AP2 832, AP3 834, non-AP STA1 818, non-AP STA2 820, or non-AP STA3 822 to transmit the PPDU.

The method 1900 may be performed by an apparatus of a QoS STA, STA, non-AP of a non-AP MLD or an apparatus of a non-AP MLD. Method 1900 may be performed by an MLD or a combination of a non-AP or AP affiliated with the MLD. The method 1900 may include one or more additional instructions. The method 1900 may be performed in a different order. One or more of the operations of method 1900 may be optional.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a first station (STA) affiliated with a first multi-link device (MLD), the apparatus comprising memory; and processing circuitry coupled to the memory, the processing circuitry configured to:
   determine a sequence number based on a transmitter sequence number space, the transmitter sequence number space being indexed by a media access control (MAC) address of a second MLD with which a second STA is affiliated;
   encode a media access control (MAC) management protocol data unit (MMPDU) in a physical layer (PHY) protocol data unit (PPDU), the MMDPU comprising the sequence number, a frame body, and an address 1 field, the address 1 field indicating an address of the second STA; and
   configure the first STA to transmit the PPDU to the second STA.

2. The apparatus of claim 1 wherein the MMPDU is an individually addressed management frame except for one of: a channel state information (CSI) frame, a noncompressed Beamforming frame, a compressed beamforming frame, a very-high throughput (VHT) compressed beamforming frame, a high-efficiency (HE) compressed beamforming/CQI frame, an extremely-high throughput (EHT) compressed beamforming/CQI frame, a probe response frame, a location measurement reporting (LMR) frame, and a fine-timing management (FTM) frame.

3. The apparatus of claim 1 wherein the PPDU is a first PPDU, the MMPDU is a first MMPDU, the sequence number is a first sequence number, the frame body is a first frame body, and wherein the processing circuitry is further configured to:
   receive a second MMPDU, the second MMPDU comprising a second sequence number, a second frame body, and an address 2 field, the address 2 field indicating an address of a third STA affiliated with a third MLD;
   determine whether a receiver cache of the first MLD indicates that a third MMPDU has been received from the third STA of the third MLD, the third MMPDU having the second sequence number, wherein the receiver cache is indexed by a MLD MAC address of the third MLD and the second sequence number; and
   in response to a determination that the third MMPDU has been received, discard the second MMPDU.

4. The apparatus of claim 3 wherein the second MMPDU is an individually addressed management frame except for one of: a channel state information (CSI) frame, a noncompressed Beamforming frame, a compressed beamforming frame, a very-high throughput (VHT) compressed beamforming frame, a high-efficiency (HE) compressed beamforming/CQI frame, an extremely-high throughput (EHT) compressed beamforming/CQI frame, a probe response frame, a location measurement reporting (LMR) frame, and a fine-timing management (FTM) frame.

5. The apparatus of claim 3 wherein in response further comprises:
   otherwise store in the receiver cache an indication that the second MMPDU was received, the indication comprising the MLD MAC address of the third MLD and the second sequence number.

6. The apparatus of claim 3, wherein the third STA and the second STA are a same STA and the second MLD and the third MLD are a same MLD.

7. The apparatus of claim 1 wherein the PPDU is a first PPDU, the MMPDU is a first MMPDU, and wherein the processing circuitry is further configured to:
   in response to a timeout event, the timeout event indicating that an acknowledgement frame was not received from the second STA to acknowledge the first MMPDU,
   encode a second MMPDU in a second PPDU, the second MMPDU comprising the sequence number and the address 1 field, the address 1 field indicating the address of the second STA, and a retry subfield, the retry subfield indicating the second MMPDU is a retransmission of the first MMPDU.

8. The apparatus of claim 7 further comprising:
   after the encode, increment a retry count.

9. The apparatus of claim 1 wherein the first MMPDU is an individually addressed management, and wherein the apparatus is further configured to:
   refrain from transmitting another individually addressed management frame to a STA affiliated with the second MLD while the first MMPDU has not been successfully sent, a retry fail has not occurred, a timer has not exceeded a threshold, or a MAC discard of the MMPDU has not occurred.

10. The apparatus of claim 1 wherein the processing circuitry is further configured to:
    receive an indication of acknowledgement of the first MMPDU from an entity of the first MLD, wherein the acknowledgement was received on a different STA of the first MLD.

11. The apparatus of claim 1 wherein the processing circuitry is further configured to:
    decode an acknowledgement from the second STA; and
    in response to receiving the acknowledgement or discarding the MMPDU use another next sequence number in the transmitter sequence number space for a next MMPDU.

12. The apparatus of claim 1 wherein the transmitter sequence number space is sequence number (SN) 10 and a shared sequence number space with STAs of the first MLD.

13. The apparatus of claim 1 further comprising: transceiver circuitry coupled to the processing circuitry; and, an antenna coupled to the transceiver circuitry.

14. The apparatus of claim 1 wherein the processing circuitry is further configured to:
   receive an indication from an entity of the first MLD to transmit an acknowledgement for an individually addressed management frame received by another STA of the first MLD; and
   encode for transmission an acknowledgement for the individually addressed management frame.

15. The apparatus of claim 1 wherein the PPDU is a first PPDU, the MMPDU is a first MMPDU, the sequence number is a first sequence number, the frame body is a first frame body, and wherein the processing circuitry is further configured to:
   receive an indication from an entity of the first MLD to retransmit a second MMPDU, the second MMPDU comprising a second sequence number, a second frame body, and an address 1 field, the address 1 field indicating an address of a third STA, wherein the third STA is affiliated with the second MLD.

16. The apparatus of claim 1 wherein the first STA is an access point (AP) and the second STA is a non-AP STA.

17. A non-transitory computer-readable storage medium that stores instructions for execution by one or more processors of an apparatus for a first station (STA) affiliated with a first multi-link device (MLD), the instructions to configure the one or more processors to:
   determine a sequence number based on a transmitter sequence number space, the transmitter sequence number space being indexed by a media access control (MAC) address of a second MLD with which a second STA is affiliated;
   encode a media access control (MAC) management protocol data unit (MMPDU) in a physical layer (PHY) protocol data unit (PPDU), the MMDPU comprising the sequence number, a frame body, and an address 1 field, the address 1 field indicating an address of the second STA; and
   configure the first STA to transmit the PPDU to the second STA.

18. The non-transitory computer-readable storage medium of claim 17 wherein the MMPDU is an individually addressed management frame except for one of: a channel state information (CSI) frame, a noncompressed Beamforming frame, a compressed beamforming frame, a very-high throughput (VHT) compressed beamforming frame, a high-efficiency (HE) compressed beamforming/CQI frame, an extremely-high throughput (EHT) compressed beamforming/CQI frame, a probe response frame, a location measurement reporting (LMR) frame, and a fine-timing management (FTM) frame.

19. A method performed by an apparatus for a first station (STA) affiliated with a first multi-link device (MLD), the method comprising:
   determining a sequence number based on a transmitter sequence number space, the transmitter sequence number space being indexed by a media access control (MAC) address of a second MLD with which a second STA is affiliated;
   encoding a media access control (MAC) management protocol data unit (MMPDU) in a physical layer (PHY) protocol data unit (PPDU), the MMDPU comprising the sequence number, a frame body, and an address 1 field, the address 1 field indicating an address of the second STA; and
   configuring the first STA to transmit the PPDU to the second STA.

20. The method of claim 19 wherein the MMPDU is an individually addressed management frame except for one of: a channel state information (CSI) frame, a noncompressed Beamforming frame, a compressed beamforming frame, a very-high throughput (VHT) compressed beamforming frame, a high-efficiency (HE) compressed beamforming/CQI frame, an extremely-high throughput (EHT) compressed beamforming/CQI frame, a probe response frame, a location measurement reporting (LMR) frame, and a fine-timing management (FTM) frame.

* * * * *